United States Patent [19]

Hung

[11] Patent Number: 5,727,130
[45] Date of Patent: Mar. 10, 1998

[54] GENETIC ALGORITHM FOR CONSTRUCTING AND TUNING FUZZY LOGIC SYSTEM

[75] Inventor: Chuan-Chang Hung, Austin, Tex.

[73] Assignee: Motorola, Inc., Schaumburg, Ill.

[21] Appl. No.: 522,027

[22] Filed: Aug. 31, 1995

[51] Int. Cl.⁶ ........................................... G06F 15/18
[52] U.S. Cl. ................. 395/13; 395/11; 395/61; 395/22; 382/155
[58] Field of Search ................ 395/13, 11, 61, 395/22; 382/155, 182

[56] References Cited

PUBLICATIONS

Hung, Chung–Chang. "Genetic Algorithms for Constructing and Tuning Fuzzy–Logic Control Systems," Center for Emerging Computer Technologies, Motorola, Inc., Sep. 1994, pp. 1–10.

Karr, Charles L., "Design of an Adaptive Fuzzy Logic Controller Using a Genetic Algorithm," U.S. Bureau of Mines, Tuscaloosa Research Center, pp. 450–457, 1991.

Valenzuela–Rendon, Manuel, "The Fuzzy Classifier System: A Classifier System for Continuosly Varying Variables," pp. 346–353., 4th Int'l Conf. on G.A., 1991.

Karr, Chuck (Mechanical Engineer with U.S. Bureau of Mines; works at Tuscaloosa Research Center in Alabama) Genetic Algorithms for Fuzzy Controllers, pp. 26–33., AI Expert, Feb. 1991.

Karr, Chuck. "Applying Genetics to Fuzzy Logic." AI Expert, Mar. 1991, pp. 38–43.

Hu, Ming–Kui, "Visual Pattern Recognition by Moment Invariants," IRE Transaction on Information Theory, Feb. 1962, pp. 179–187.

Harvey, Audrey F., National Instruments, "DMA programming varies considerably from bus to bus," Personal Engineering & Instrumentation News, Dec. 1990, pp. 49–56.

Whitley, D., et al., "Genetic algorithms and nueral networks: optimizing connections and connectivity," Parallel Computing 14, (1990), pp. 347–361.

Uckun, Sedar et al., "Managing Genetic Search in Job Shop Scheduling," IEEE Expert, Oct. 1993, pp. 15–24.

Goldberg, David E., "Genetic Algorithms in Search, Optimization, and machine Learning," 1989, (entire text referenced; Table of Contents included).

Kohonen, Teuvo, "The Self–Organizing Map," IEEE, 1990, pp. 144–1479.

Hung, Chuan–Chang, "Building a Neuro–Fuzzy Learning Control System," AI Expert, Nov. 1993, pp. 40–49.

M.A. Lee and H. Takagi, "Integrating Design Stages of Fuzzy Systems using Genetic Algorithms," Second IEEE Int'l. Conf. on Fuzzy Systems, vol. 1, pp. 612–617. Mar. 1993.

H. Ishigami, et al., "Automatic Generation of Hierarchical Structure of Fuzzy Inference by Genetic Algorithm," 1994 Int'l. Conf. on Neural Netwotks, vol. 3, pp. 1566–1570. Jun. 1994.

H. Ishibuchi, et al. "Acquisition of Fuzzy Classification Knowledge Using Genetic Algorithms," 1994 Int'l. Conf. on Fuzzy Systems, pp. 1963–1968, Jun. 1994.

A. Jameel and C. Koutsougeras. "Experiments with Kohonen's Learning Vector Quantization in Handwritten Character Recognition Systems," 1994 Midwest Symposium on Circuits and Systems, vol. 1, pp. 595–598, Aug. 1994.

(List continued on next page.)

*Primary Examiner*—Robert W. Downs

[57] ABSTRACT

In an optical character recognition application, training sets of optimized moment invariant character data (801) are used to evaluate fuzzy logic systems (803) modeled with parameters produced through the use of a genetic algorithm (802). The fuzzy logic systems (803) are evaluated (807) and given a score to input back into the genetic algorithm (802), which uses the score in a reproduction process (104) to produce new chromosomes (105) for reinsertion into the fuzzy logic system models (803). Each of the chromosomes may contain both membership function representations and representations of the rules of the fuzzy logic system.

18 Claims, 6 Drawing Sheets

OTHER PUBLICATIONS

A.R. McNeil and T. Sarkodie–Gyan, "A Neural Network based recognition scheme for the classification of industrial components," 1995 Int'l. Conf. on Fuzzy Systems, vol. 4, pp. 1813–1818, Mar. 1995.

T. Murata and H. Ishibuchi, "Adjusting Membership Functions of Fuzzy Classification Rules by Genetic Algortihms," 1995 Int'l. Conf. on Fuzzy Systems, vol. 4, pp. 1819–1824, Mar. 1995.

GENETIC ALGORITHM FOR CONSTRUCTING AND TUNING FUZZY LOGIC SYSTEM

FIELD OF THE INVENTION

This invention relates generally to a data processing system, and more particularly to the utilization of a genetic algorithm to construct and tune a fuzzy logic system.

BACKGROUND OF THE INVENTION

Data processors have been developed to function as binary machines whose inputs and outputs are either interpreted as ones or zeroes, and no other possibilities may exist. While this works well in most situations, sometimes an answer is not simply "yes" or "no," but something in between. A concept referred to as "fuzzy logic" was developed to enable data processors based on binary logic to provide an answer between "yes" and "no."

Fuzzy logic is a logic system which has membership functions with fuzzy boundaries. Membership functions translate subjective expressions, such as "temperature is warm," into a value which typical data processors can recognize. A label such as "warm" is used to identify a range of input values whose boundaries are not points at which the label is true on one side and false on the other side. Rather, in a system which implements fuzzy logic, the boundaries of the membership functions gradually change and may overlap a boundary of an adjacent membership set. Therefore, a degree of membership is typically assigned to an input value. For example, given two membership functions over a range of temperatures, an input temperature may fall in the overlapping areas of both the functions labeled "cool" and "warm." Further processing would then be required to determine a degree of membership in each of the membership functions.

A step referred to as "fuzzification" is used to relate an input to a membership function in a system which implements fuzzy logic. The fuzzification process attaches concrete numerical values to subjective expressions such as "the temperature is warm." These numerical values attempt to provide a good approximation of human perception which is not generally limited to an environment of absolute truths. After the fuzzification step, a rule evaluation step is executed. During execution of the rule evaluation step, a technique referred to as "MIN-MAX" fuzzy inference is used to calculate numerical conclusions to linguistic rules defined by a user. Conclusions from the rule evaluation step are referred to as "fuzzy outputs" and may be true to varying degrees. Thus, competing results may be produced. A last step in the fuzzy logic process is referred to as "defuzzification." As the name implies, defuzzification is the process of combining all of the fuzzy outputs into a composite result which may be applied to a standard data processing system. For more information about fuzzy logic, refer to an article entitled "Implementing Fuzzy Expert Rules in Hardware" by James M. Sibigtroth. The article, which is hereby incorporated by reference herein, was published in the April, 1992 issue of AI EXPERT on pages 25 through 31.

Fuzzy logic control systems have become increasingly popular in practical applications. Traditionally, the design of the knowledge base including membership functions and rules relies on a subjective human "rule-of-thumb" approach for decision-making. In addition, the control system is adapted (tuned) to the desired performance through trial and error. As a result, designing and adapting the fuzzy logic control system becomes a time-consuming task. To overcome this drawback, neural network techniques have been used in assisting designers to generate rules and adapt the fuzzy logic control system automatically. For further discussions in this area, please refer to C. C. Hung, "*Building a Neuro-Fuzzy Learning Control System,*" AI Expert, November, 1993; C. C. Hung, "*Developing an Adaptive Fuzzy Logic System Using a Supervised Learning Method,*" Proceedings of the Embedded Systems Conference East, April, pp. 209–220, 1994.

Genetic algorithms (hereinafter also referred to as "GA") are an adaptive learning method based on the mechanics of biological principles, and which are discussed in D. E. Goldberg, "*Genetic Algorithms in Search, Optimization and Machine Learning,*" Addison Wesley, 1989, which is hereby incorporated by reference herein. They are an example of using a random search as a tool to seek a global solution in a multimodal search space. In every generation, they select the best artificial creature (string) structures by performing combinatorial optimization of functions whose potential solutions can be encoded as a binary string to form a new set of strings. Afterward, an occasional new generation of candidate solutions is formed and is repeatedly tested and exchanged in the search for better and better performance. Currently, this technique has become an attentive solution to complex problems such as the searching method for job shop scheduling, which is discussed in Serdar Uckun, Sugato Bagchi, and Kazuhiko Kawamura and Yutaka Miyabe, "*Managing Genetic Search in Job Shop Scheduling,*" IEEE Expert, October, 1993, which is hereby incorporated by reference herein, and the optimization method for neural network training, which is discussed in D. Whitley, T. Starkweather, and C. Bogart, "*Genetic Algorithm and Neural Networks: Optimizing Connections and Connectivity,*" Parallel Computing 14, pp. 347–361, 1992, which is hereby incorporated by reference herein.

Several researchers have demonstrated the feasibility of applying a GA in discovering the knowledge base of a fuzzy logic control system, which is discussed in Charles L. Karr, "*Design of an Adaptive Fuzzy Logic Controller Using a Genetic Algorithm,*" Proceeding of The Fourth International Conference on Genetic Algorithms, 1991 and Valenzuela-Rendon Manuel, "*The Fuzzy Classifier System: A Classifier System for Continuously Varying Variables,*" Proceeding of The Fourth International Conference on Genetic Algorithms, 1991, which are hereby incorporated by reference herein. The initial rule set and membership functions can be evolved from exploratory procedures toward an acceptable solution by random sets of input data. Moreover, an adaptive fuzzy logic system can be developed to account for changes occurring in the system by altering membership functions or rules from another evolution of the GA.

Several authors have developed fuzzy logic systems with the use of genetic algorithms. Please refer to C. Karr, "*Genetic Algorithms for Fuzzy Controllers*", AI Expert, February 1991; C. Karr, "*Applying Genetics to Fuzzy Logic*", AI Expert, March 1991; and J. R. Koza and M. A. Keane, "*Cart Centering and Broom Balancing by Genetically Breeding Populations of Control Strategy Programs*", IJCMN-90, 1990, which are hereby incorporated by reference herein. The deficiencies in these and other prior art techniques for developing fuzzy logic parameters with genetic algorithms is that they derive the parameters for the membership functions and fuzzy rules in separate phases or steps. This is inefficient in that additional computational time and effort is required for performing these separate phases. Therefore, what is needed in the art is a technique for deriving fuzzy logic parameters with a genetic algorithm that is more efficient.

One of the areas being explored for utilization of the advantages of fuzzy logic systems is in optical character recognition (hereinafter also referred to as "OCR"). In an optical character recognition application, slight variations in printing cause changes in character height and width; in addition, misfeeding the document can skew the character image, making the edges of character segments hard to detect because of overlaps in the slices. Therefore, scale, translation and rotation-invariant recognition is necessary for the optical characters. A fuzzy logic system is inherently well-suited for dealing with imprecise data and processing rules in parallel. However, the actual implementation of fuzzy rule-based systems for this type of application often relies on a substantial amount of heuristic observation to express the knowledge of the system. In addition, it is not easy to design an optimal fuzzy system to capture the scale, translation and rotation-invariant features of each character.

Traditionally, fuzzy systems have been built manually by experts. The process is very subjective and time-consuming, as discussed above.

Thus, there is also a need in the art for a technique for combining genetic algorithms with fuzzy logic systems to design a more efficient OCR application.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENT

Figure 1:
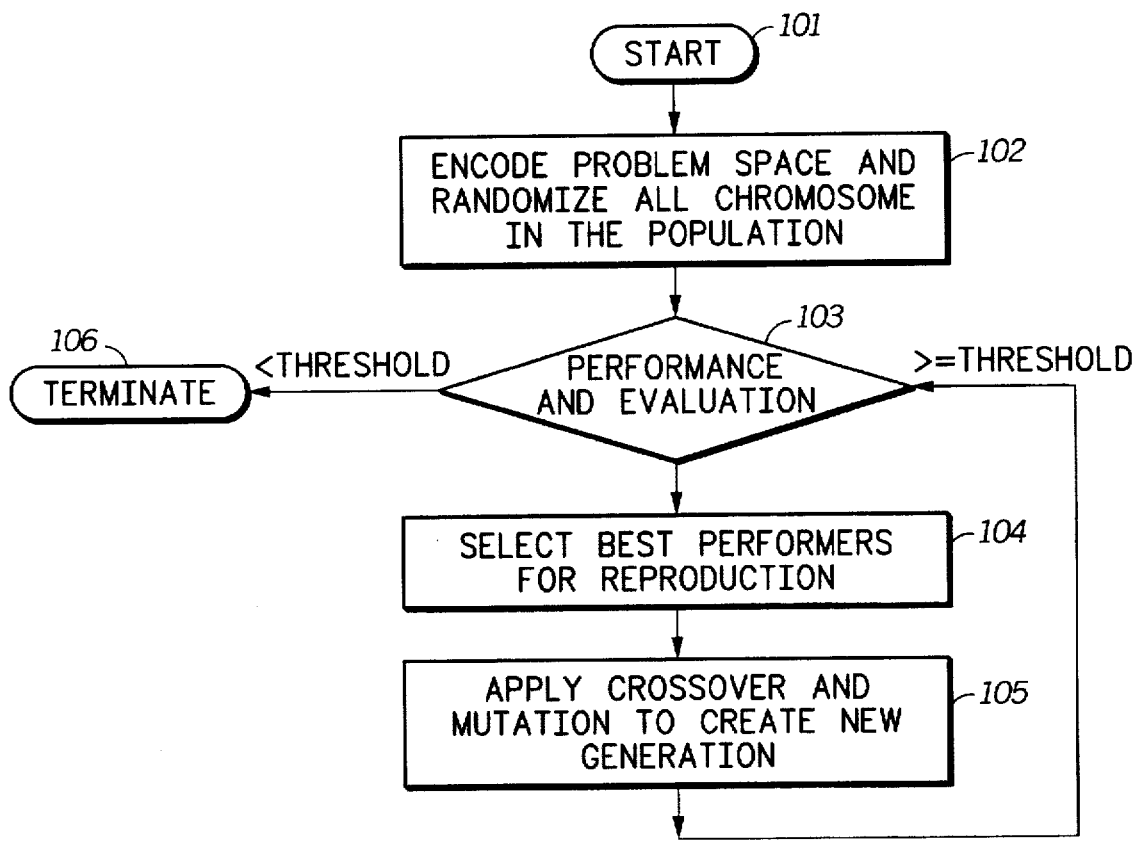
FIG. 1 illustrates a flow diagram illustrating the operation of a genetic algorithm.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The present invention, as will be described in more detail below, utilizes a genetic algorithm for deriving the membership functions and/or rules for a fuzzy logic system. As each population (set of chromosomes) is established, they are then placed into a model of the fuzzy logic system and evaluated to determine how well each chromosome performs. The results of this evaluation are then utilized to derive new chromosomes that are then reinserted into the evaluation process until an ideal solution is achieved.

A unique aspect of the present invention is the inclusion within one chromosome of both membership functions and rules. The prior art has either included only the membership functions or the rules at any one particular time within a chromosome. One of the advantages achieved with this configuration is that less computational time is required by developing both the membership functions and the rules during one set of cycles, instead of doing these in phases.

With respect to OCR, the present invention develops a set of training data within a neural network system for developing and tuning the fuzzy logic parameters for an OCR application. This methodology is unique within the art whether or not the chromosomes include membership functions or rules, or both.

Principle of Genetic Algorithms

Genetic algorithms start by randomly generating a population composed of the sets of existing solutions (strings, or individuals). Based on the genetic prescription in natural terminology, the strings are represented as chromosomes that are composed of genes, which may take on some number of values called alleles. The specific position of a gene is called a locus. With GAs, the first step of the optimization process is to code the input and output parameters as fixed-length strings of symbols over a given alphabet A. This alphabet is often taken to be 0, 1. For example, consider the problem of maximizing the function $f(x)=x^2$, where x is an input parameter permitted to vary between 0 and 31. With a five-bit (binary digit) unsigned integer, we can encode x=31 to a binary string "11110".

Then the strings are evaluated to determine their performance and to determine which one may fit the candidate solution. Therefore, the best strings will receive more chances to reproduce their generation than those with poor performance. Randomly choosing pairs for mating by the genetic operators (described later) result in the creation of a new generation. Then, the higher performance new generation participates in the next evaluation. Afterwards, when the performance value reaches some threshold value, the genetic generation will be terminated. The performance route is described as follows:

The process begins at step 101 and proceeds to step 102 wherein the problem space is encoded, in a manner described below, so that the genes of a chromosome represent parameters desired to be produced. For example, the parameters needed to define a membership function and/or a rule are encoded as genes. The initial chromosomes within the population are encoded with random numbers as a starting point for the alleles.

Thereafter, in step 103, the chromosomes are evaluated to determine their performance within a model of the fuzzy logic system to be developed. The evaluation process includes a comparison to a threshold value (e.g., square of summed errors, hit or miss on character to be recognized, etc.).

If the desired threshold is met, the process then terminates in step 106 with a chromosome that provides the parameters for the fuzzy logic system. However, if the threshold is not met in step 103, the process proceeds to step 104, wherein a selection of the best chromosome performers is accomplished to insert into a reproduction process within the GA. In step 105, one or more of these various reproduction processes are applied to the selected best performers to create a new generation of chromosomes to then insert into the performance and valuation step 103.

One possible reproduction process in step 105 is a crossover-like operation where we pick one cross site and exchange. A and B represent two string structures chosen from the population pool according to performance fitness criteria.

A=xxxxx, B=yyyyy

A cross site may be chosen by a random "roulette wheel" selection.

xxx|xx, yyy|yy

The resulting crossover yields two new strings A and B following the partial exchange.

A=yyyxx, B=xxxyy

Another reproduction process is mutation. This operation is a random alteration of the value of a string position through the string space with small probability. It can protect against premature loss of important genetic material through selection and elimination. This operation can be considered as a secondary (and optional) mechanism of genetic algorithm adaptation.

As discussed above, fuzzy rule-based systems have often been used in OCR applications. Typically, one rule is used to recognize one character, and each character is represented as one consequent of a rule. The actual implementation of fuzzy rule-based systems for this type of application often relies on a substantial amount of heuristic observation to express the membership functions for the antecedents of each rule. Each rule consists of several antecedents and consequents depending on the number of inputs and outputs, respectfully. Each antecedent in a given rule is defined as an input membership function, and each consequent is defined as an output membership function.

Neural networks consist of highly interconnected processing units that can learn and globally estimate input-output functions in a parallel-distribution framework. Fuzzy logic system store and process rules that output fuzzy sets associated with input fuzzy sets in parallel. The similar parallelism properties of neural nets and fuzzy logic systems have lead to their integration in studies of the behavior of highly complex systems. This behavior must necessarily be imprecisely defined because of the systems' complexity. In recent years. Learning Vector Quantization ("LVQ") has become an impressive classification technique. LVQ, which is well-known in the art, accomplishes learning by placing input data in a finite number of known classes. The result is that this method provides the supervised effect of learning and enhances the classification accuracy of input patterns.

Since each alphanumeric character is recognized by one rule, the consequent of each rule is one character. The critical issue is to design more robust input membership functions that correspond to a rule. The linguistic term of a rule's antecedent, such as "input 1 is small," depends upon how accurately the input space is qualified while defining membership functions. LVQ can group similar input data into the same class by adjusting the connection weights between the inputs and their corresponding output. In other words, through supervised learning, the features of each class can be extracted from its associated inputs.

In an OCR application, slight variations in printing caused changes in character height and width; in addition, misfeeding the document may skew the character image, making the edges of character segments hard to detect because of overlaps in the slices. As discussed above, a fuzzy logic approach is inherently well-suited for dealing with imprecise data and processing rules in parallel. The present invention proposes to use a fuzzy rule-base to solve the problems of optical character recognition discussed here.

The process of designing a fuzzy rule-based system is tedious and critical for the success of the recognition. It must be done as efficiently and accurately as possible if it is to sufficiently address the OCR problem.

Figure 2:
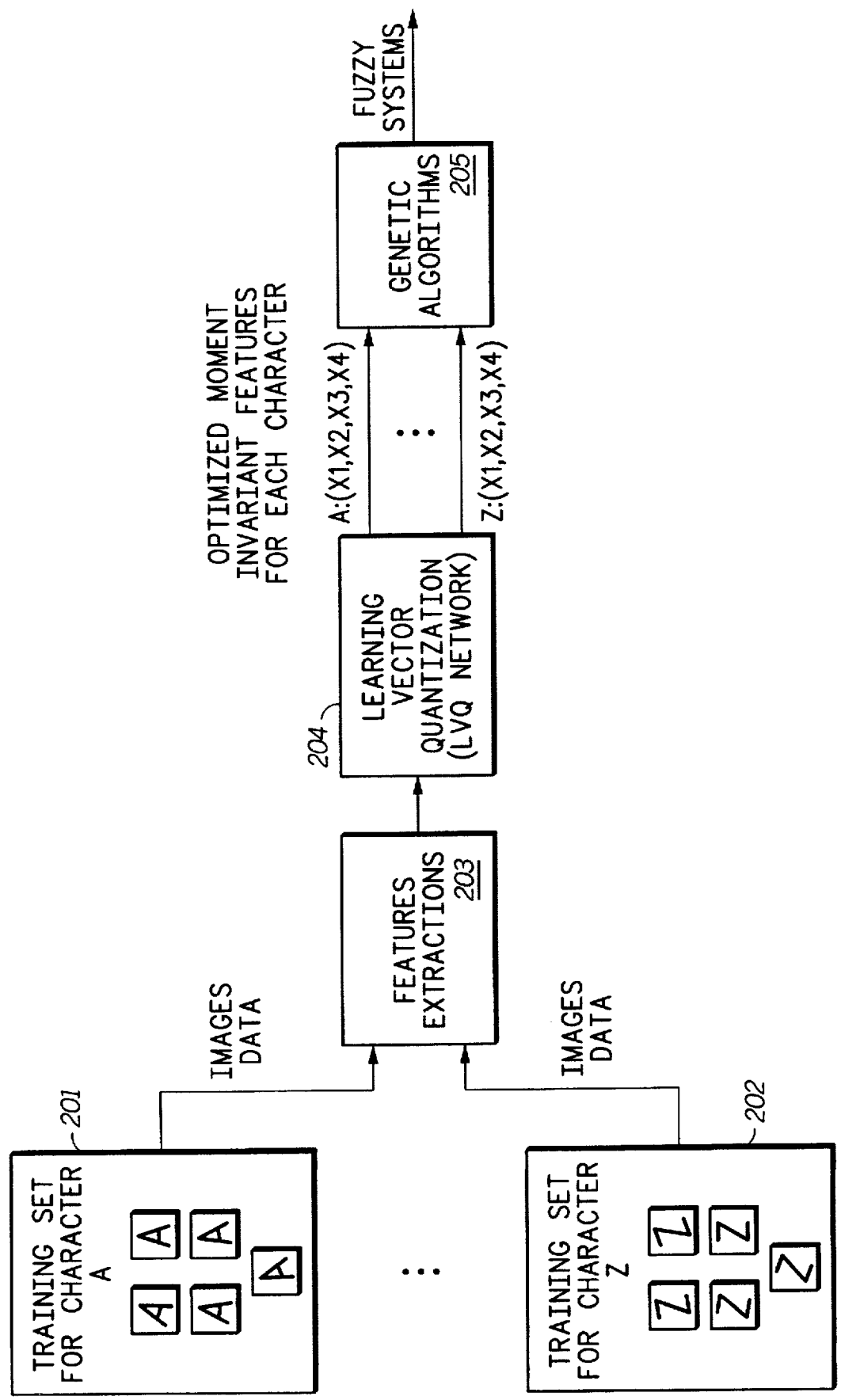
FIG. 2 illustrates a portion of the present invention pertaining to the insertion of training data for an optical character recognition system.

A method for developing a scale, translation, and rotation-invariant fuzzy system for optical character recognition is described as follows:

FIG. 2 shows the procedure for this method in accordance with the present invention. First, in steps 201–202, five different orientations for every character image are scanned and organized into a set of bit-map training data. Second, in step 203, the features of every character in all training sets are extracted using the theory of two-dimensional moment invariants. Four moment invariant features, ($x1, x2, x3, x4$), are derived from the second-order and third-order moment which are independent of the position, size and orientation of each character image. However, slight variations in printing cause changes in character height and width; in addition, misfeeding the document may skew the character image, making the edges of character segments hard to detect because of overlaps in the slices. The features extracted from each character image under different orientations, translation, or scalar by the moment invariant method could give inconsistent results. Hence, a learning vector quantization (LVQ) neural network is introduced to optimize the features of each character having different orientations, translations, or scalar. Steps 202–203 are performed in a well-known manner, which is discussed in Ming-Kuei Hu, "*Visual Pattern Recognition Moment Invariants*," IEEE Transaction on Information Theory, pp. 179–186, 1962, which is hereby incorporated by reference herein. Step 204, which implements an LVQ network, is also performed using a well-known process, which is disclosed in Teuvo Kohonen, "*The Self-Organizing Map*," Proceeding of the IEEE, Vol. 78, No. 9, pp. 1364–1479, September 1990, which is hereby incorporated by reference herein.

Figure 3:
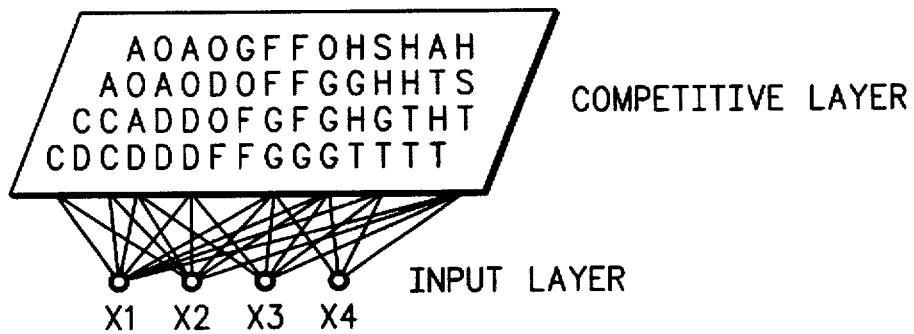
FIG. 3 illustrates an untrained LVQ network structure.

As illustrated in FIG. 3, the LVQ learning system is a two-layered network. The first layer is the input layer; the second is the competitive layer, which is organized as a two-dimensional grid. All units (a "unit" is represented as one input variable, such as $x1$, of one input pattern ($x1, x2, \ldots$)) from the first layer to the second are fully interconnected. In the OCR example, the units of the second layer are grouped into classes, each of which pertains to one character. For purposes of training, an input pattern consists of the values of each input variable and its corresponding class (i.e., the character that it represents). A quantization unit in the competitive layer has an associated vector comprising the values of each interconnection from all the units in the input layer to itself. This vector implicitly defines an ideal form of character within a given class.

The LVQ learning system determines the class borders using a nearest-neighbor method. This method computes the smallest distance between the input vector X: ($x1, x2, \ldots xn$) and each quantization vector. This computation is done in terms of Euclidean distance (straight line distance in multi-dimensional space).

Input vector X belongs to class C(x), and quantization vector w(i) belongs to class C(w). If C(x) and C(w) belong to different classes, the w(i) is pulled away from the class border to increase the classification accuracy. If C(x) and C(w) have the same class, the w(i) closes to the center of the class. Then each input pattern is presented sequentially in the input layer and several iterations. The weights of the quantization units in each class are fine-tuned to group around the center of the class. Therefore, the weight vector of the center unit within the class is represented as the optimum classification for the corresponding class. The result of the LVQ learning process is an optimized vector for each alphanumeric character. This optimized character is invariant to scale, translation and rotation.

Figure 4:
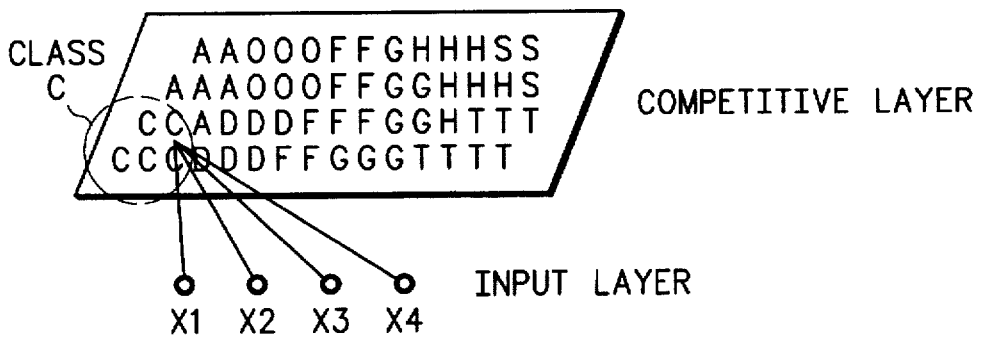
FIG. 4 illustrates a trained LVQ network during recognition.

FIG. 4 represents the trained network. Each class has a more clearly distinguished class boundary than before training. The circled class, C, is represented as the weight vector of the center unit within the class associated with each input feature. As a result, the weight vector of the class C will be the optimized features for character C.

Next, as described further below, the optimized features of each character are applied to the GA kernel to evolve a new fuzzy system.

The new rule set and membership functions can be evolved from an exploratory procedure toward an acceptable solution by an objective function. This is performed by a GA in the manner discussed above with respect to FIG. 1. The evolution of one rule (one character) using the GA kernel can be performed independent of other rules, since one rule is used to recognize one character.

Merging Genetic Algorithms With a Fuzzy Logic System
Modeling a fuzzy logic system using genetic algorithms The first step in applying the genetic algorithms to model the fuzzy logic system is to determine a way to encode the parameters of membership functions and rules into a string. For example, suppose the fuzzy system has i inputs, j output, and k rules and that each input and output have n and m membership functions respectively. One input membership function has four parameter points (if it is a trapezoid) (three parameter points (if it is a triangle)), and each output membership function is treated as a singleton. All the encoding values of membership functions are treated as integer values. (Note, output membership functions could be encoded into a chromosome so that a centroid method would yield a fuzzy logic output.) For the rules encoding, the linguistic terms are represented as integers. For example, if a rule consists of two antecedents (If input 1 is "Small" and input 2 is "Large", and 1 consequent (Then output is "character C"). The labels of antecedents (Small and Large) and that of the consequent (character C) can be indexed as integers. As a result, the rule can be represented as (0:Small, 2:Large; 3:C). Now we encode all the values of parameters in the membership functions and labels of all rules into one string (one chromosome).

The representation of a string is listed as follows:
$(I(1)_a^1, (I(1)_b^1, (I(1)_c^1, (I(1)_d^1, (I(1)_a^2, (I(1)_b^2, (I(1)_c^2, (I(1)_d^2, \ldots$
$. (I(1)_a^n, (I(1)_b^n, (I(1)_c^n, (I(1)_d^n, (I(2)_a^1, (I(2)_b^1, (I(2)_c^1, (I(2)_d^1, \ldots$
$\ldots (I(i)_a^1, (I(i)_b^1, (I(i)_c^1, (I(i)_d^1, \ldots (I(i)_a^n, (I(i)_b^n, (I(i)_c^n, (I(i)_d^n,$
$O(1)^1, O(1)^2, \ldots O(1)^m, O(2)^1, O(2)^2, \ldots O(j)^1, O(j)^2, \ldots$
$.O(j)^m, Id(1)_1^n, Id(2)_1^n, \ldots Id(i)_1^n, Od(1)_1^m, Od(2)_1^m, \ldots Od$
$(j)_1^m, \ldots, Id(1)_k^n, Id(2)_k^n, \ldots Id(i)_k^n, Od(1)_k^m, \ldots Od(j)_k^m).$
where $I(i)_b^n$ is the value of the second parameter "b" of $n^{th}$ membership function for a $i^{th}$ input, $O(j)^m$ is the singleton value of $m^{th}$ membership function for $j^{th}$ output, $Id(i)_k^n$ is the $n^{th}$ membership index of $i^{th}$ input for $k^{th}$ rule, and $Od(j)_k^m$ is the $m^{th}$ membership index of $j^{th}$ output for $k^{th}$ rule. This assumes that the membership function has four parameters. Of course, alternate membership functions may have fewer or more parameters.

Figure 5:
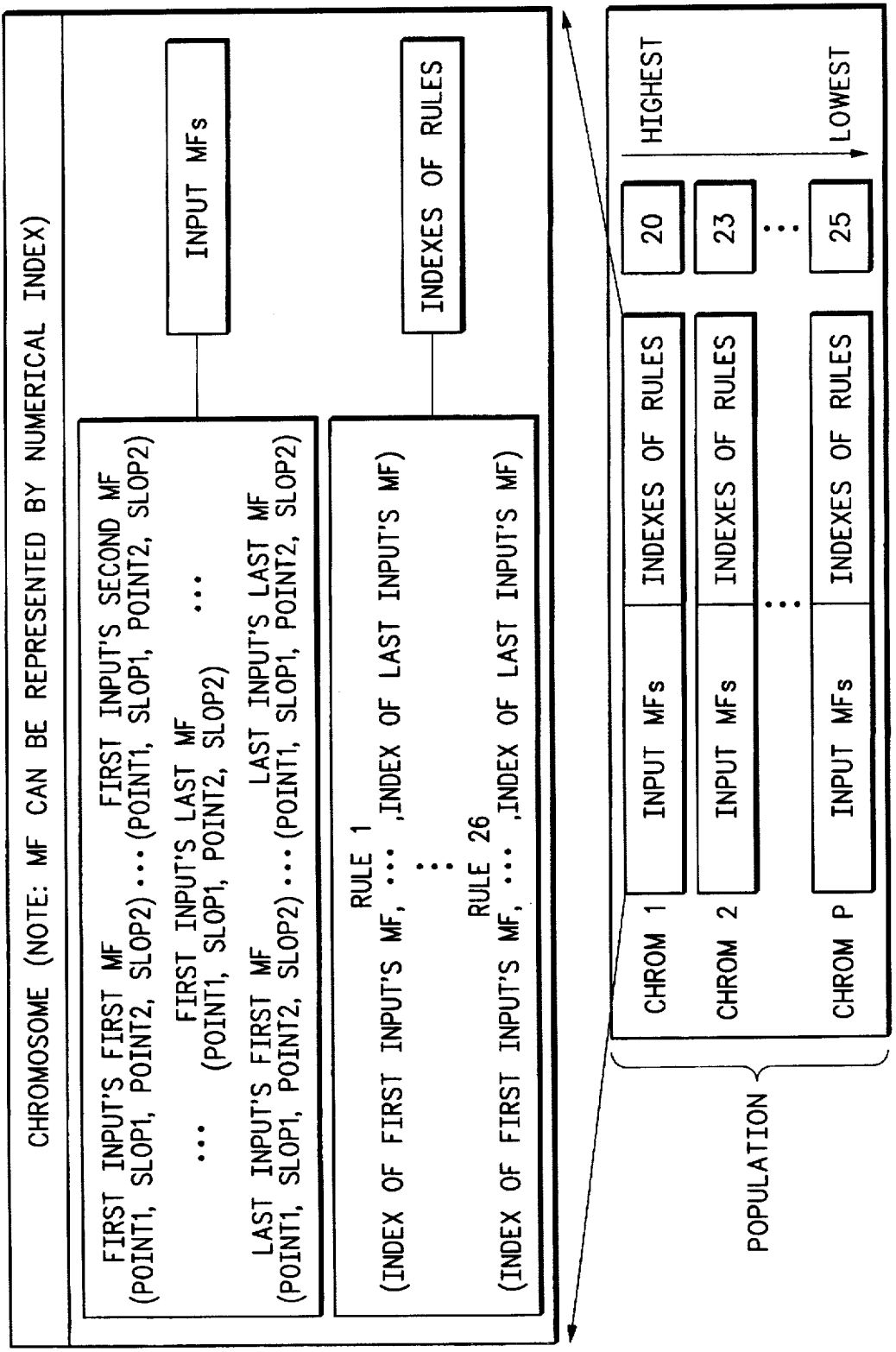
FIG. 5 illustrates a structure of a chromosome in accordance with one embodiment of the present invention.

Referring to FIG. 5, there is illustrated a depiction of p chromosomes within a particular population. Each chromosome includes the input membership functions ("M.F.s") and the indexes of rules.

For the OCR application of the present invention, each chromosome includes the input membership functions and the indexes of rules. However, the output membership functions may not be encoded into the chromosome. This is because there are no overlapped output membership functions among the rules. Each rule has a unique output membership function (consequent) (e.g., character is A: A is output membership function for character output). Hence, traditional defuzzification schemes (e.g., centroid method) are not necessary to be applied to determine the character output. As an alternative, another way to determine which character is recognized is to select the rule that has the maximum rule strength from the minimum operation of the rule antecedents. In addition, by doing this, the entire length of the chromosome can be minimized.

Formalization of the Fuzzy Recognition System

Here, the fuzzy system of the alphanumeric character recognition demonstrates the feasibility of using the GA to construct the knowledge base of a fuzzy logic system without prior information. This fuzzy system consists of four inputs (x1, x2, x3, x4) which are moment invariants produced by image moment and the LVQ network previously described and one output character. Each input and output contains 5 and 26 membership functions, respectively. Five membership functions are chosen for each input, however, any other number of membership functions could be chosen. The number of membership functions is chosen by experience. Generally, more membership functions result in a longer chromosome while less membership functions may result in inadequate accuracy of the resultant fuzzy logic system.

The system is assumed to have 26 rules (for 26 upper-case alphabets). Note that the format of the rules is unknown.

After modeling this fuzzy system based on the previously described representation of a string (see FIG. 5), an evaluation function is determined to minimize the total error function and to select the optimum solution, which includes the membership functions and rules. Note, that either of the membership functions or the rules could be omitted from the chromosomes for this evaluation.

As illustrated in FIG. 5, the score of each string calculated from an evaluation function is placed at the end of the string. Hence, the form of a chromosome is represented as the parameter's values of membership functions, the index of rules, and the score.

However, before feeding each string into the evaluation function, we need to convert the data of a genetic string into the form of membership function and rules. Then fuzzy reasoning can be performed to calculate the actual output character of the system according to the given optimized feature vector in the training set (i.e., 26 vectors for all characters). The score is obtained by accumulating the error between every actual output character and its desired character of the given feature vector from the training set. In other words, the score for a particular chromosome will be equal to the number of misses on the character set. In this case, with 26 characters, a score of 20 indicates that particular chromosome only provided an accurate recognition of 6 characters when the chromosome was inserted into the model for the fuzzy logic system and the input vectors from the LVQ system were applied to this modeled fuzzy logic system.

Based on the above description, the evaluation function can be defined in the following pseudocode:

```
int Eval(chro_data string, int string_length)
{
int sum_errors;
    /*decode the chromosome to the parameters that can be executed in
        the fuzzy processes*/
    Translate(string, string_length);
sum_errors = 0;
for (sample=0; sample< feature vectors of the training data; i++)
{
        sum_errors += (Fuzzy_System(sample, translated_string)-
                Desired output character from the given sample);
}
    return (sum_errors);
}
int Fuzzy_System(int sample, data translated_string)
{
int output; /* character output (i.e. A can be represented by number 0, . . .
Z
        is 25)
calculate the actual output character from the following three processes;
Fuzzification;
Rule Evaluation;
output = Simplified Defuzzification;
return (output);
}
```

When the fuzzy system is still in an immature state, it may fail to report a match for some number of the presented test characters (vectors), making it difficult for the evaluation function to generate useful values. Hence, the evaluation function must be modified to improve its performance in this situation. A solution is to provide the output character randomly (between A and Z; e.g., a "random walking" procedure) if the given input feature data do not find any rules to identify them. By doing this, the searching ability can be improved significantly. In other words, when the training data is plugged into the fuzzy logic system configured in accordance with a particular chromosome, the maximum operation of the min/max evaluation portion may not be able to be performed because all zeros have resulted from the minimum operation (the training vector did not map onto any membership functions). It is in this case that a randomized output such as discussed above may be produced. This "random walking" procedure may result in a faster convergence of the system to an adequate solution.

Figure 6:
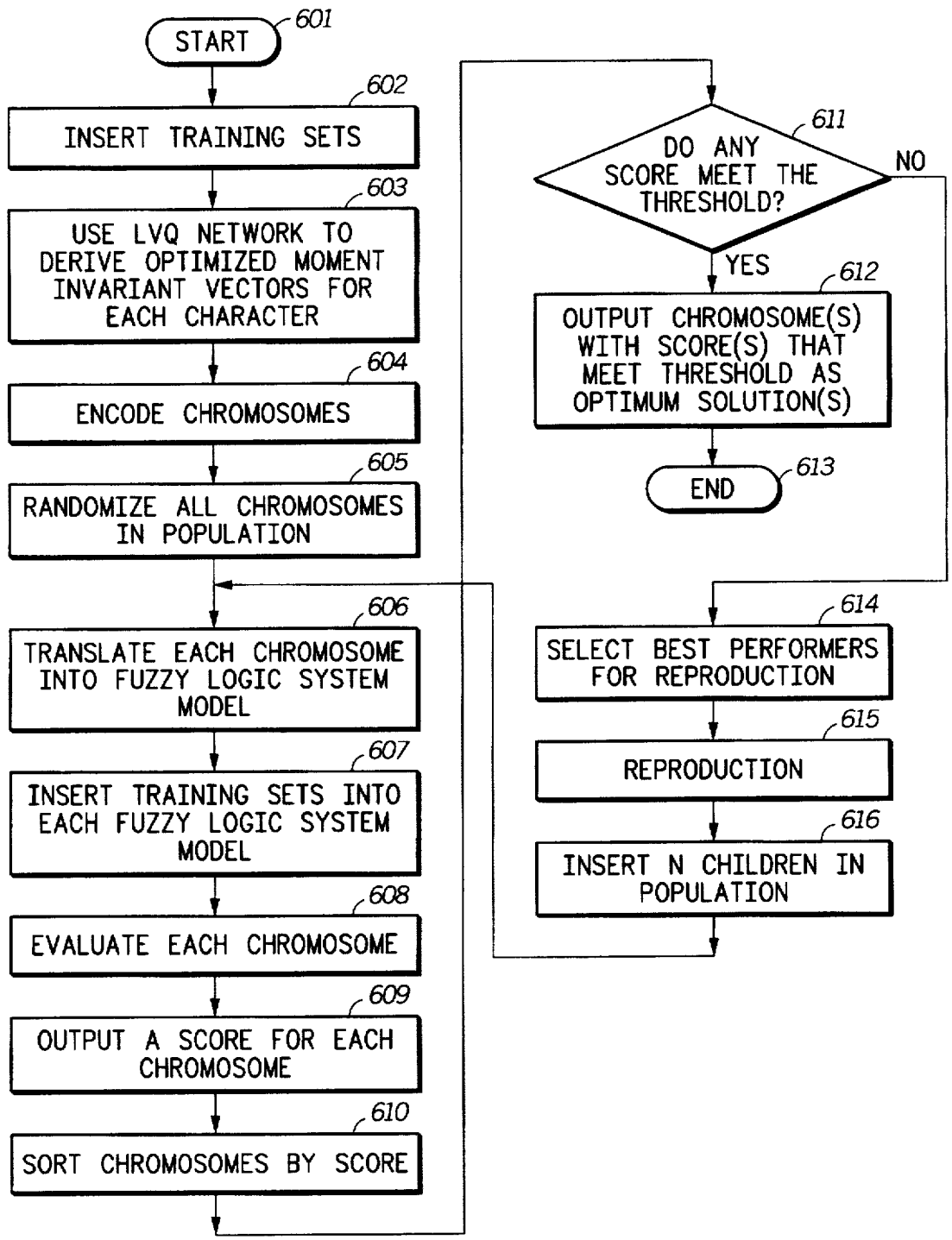
FIG. 6 illustrates a flow diagram in accordance with the present invention.

Referring next to FIG. 6, there is illustrated a flow diagram illustrating the overall process of OCR in accordance with the present invention. Note that the present invention is applicable to any fuzzy logic system other than with respect to an OCR application. The process begins at step 601 and proceeds to step 602 wherein the training sets of character data are inserted into the system. Essentially, bit map images of the 26 alphanumeric characters in various translational, scalar and rotational positions (e.g., five different positions each) are entered into the system. As described above with respect to FIG. 2, a features extraction process is produced by image moment technique and the results are inputted into an LVQ network to produce optimized moment invariant vectors for each character (step 603). Steps 602 and 603 are performed using well-known techniques.

Next, in step 604, which may be perform in parallel with steps 602 and 603, the chromosomes required by the desired fuzzy logic system are encoded as illustrated with respect to FIG. 5. Essentially, the number of membership functions needed within a particular chromosome is dependent upon the number of input vector values for each optimized vector produced by the LVQ network. Thus, if each vector has four values, then these four values will dictate the number of inputs for the fuzzy logic system. Each input then will be compared to a set of membership functions, which may comprise any number of membership functions (e.g., 5). In turn, each membership function is defined by three points for a triangular shaped membership function and four data values for a trapezoidal shaped membership function.

Next, in step 605, each of the chromosomes within the population are provided with sets of random data as an initial set of values to insert into the present invention. In step 606, each of the chromosomes is translated into parameters for the desired fuzzy logic system. Note, as discussed above, various integer values may be used to encode the various parameters of the fuzzy logic system for the chromosomes. Step 606 essentially performs the task of decoding the values in these chromosomes. The result of step 606 is the production of a fuzzy logic system model for each of the chromosomes (which presently contain random data). Next, in step 607, the optimized training vectors are inserted into each fuzzy logic system model. In step 608, an evaluation of each chromosome is then performed by determining whether a particular chromosome is able to recognize one or more of the 26 alphanumeric characters inserted as the training data. The results of this evaluation are then outputted as scores for each chromosome in step 609. One manner for scoring each chromosome is to indicate how many characters were correctly recognized by the fuzzy logic system modeled under a particular chromosome.

In step 610, the chromosomes are then sorted by score, whereby the "better" chromosomes have lower scores, since a lower score indicates that more characters were recognized.

Next, in step 611, a determination is made whether or not any of the scores meet a predetermined threshold value. In this example, since it is desired to have an OCR that is 100% accurate in recognizing alphanumeric characters, the threshold score will be equal to zero, since it is desired to have the ultimate fuzzy logic system be able to accurately recognize characters with 100% accuracy.

If the threshold value is met, the process proceeds to step 612 wherein the chromosome(s) having the score(s) meeting the desired threshold are outputted as optimum solution(s). However, if none of the chromosome(s) have score(s) meeting the desired threshold, the process proceeds to step 614, wherein the best performers are chosen for reproduction. In step 615, reproduction is performed with the best performers. Note, any number of different techniques for selecting the best performers and then performing a reproduction process may be utilized at this point. For example, as discussed above, the top N performers may be chosen and then processed through a crossover and/or mutation process to produce one or more children. These children are then inserted into the population to replace the worst performers.

In one embodiment of the present invention, a GENITOR process may be utilized, which takes two parents from the top percent of the better scores and performs a crossover operation to produce two children. The two children are then reevaluated and scored. The child having the best score of these two children is then inserted and the lowest scored chromosome in the population is dropped. Please refer to Darrell Whitley and Thomas Hanson, *Optimizing Neural Networks Using Faster, More Accurate Genetic Search*, 3rd International Conference on Genetic Algorithms, 1989, which is hereby incorporated by reference herein.

After N children have been inserted into the population at step 616, the process returns to step 606 to loop through steps 606–610 for the new population containing the inserted children produced in the reproduction process of step 615. In step 611, a determination is again made whether or not any of the scores meet the threshold. Eventually, one or more chromosomes will produce a score meeting the threshold value. In theory, all chromosomes within the population will end up with a score of 0, since the principal of heritage will result in all of the chromosomes inheriting the best features from each other.

The result of the process in FIG. 6 is that one or more chromosomes are outputted from the process, which may then be translated into the fuzzy logic system parameters. This fuzzy logic system utilizing these parameters will then operate with a 100% accuracy in recognizing the alphanumeric characters presented within the training sets.

Note, in the process described with respect to FIG. 6, it is not necessary that the chromosomes contain both membership functions and rules. One or the other or both may be inserted into a particular chromosome.

Figure 7:
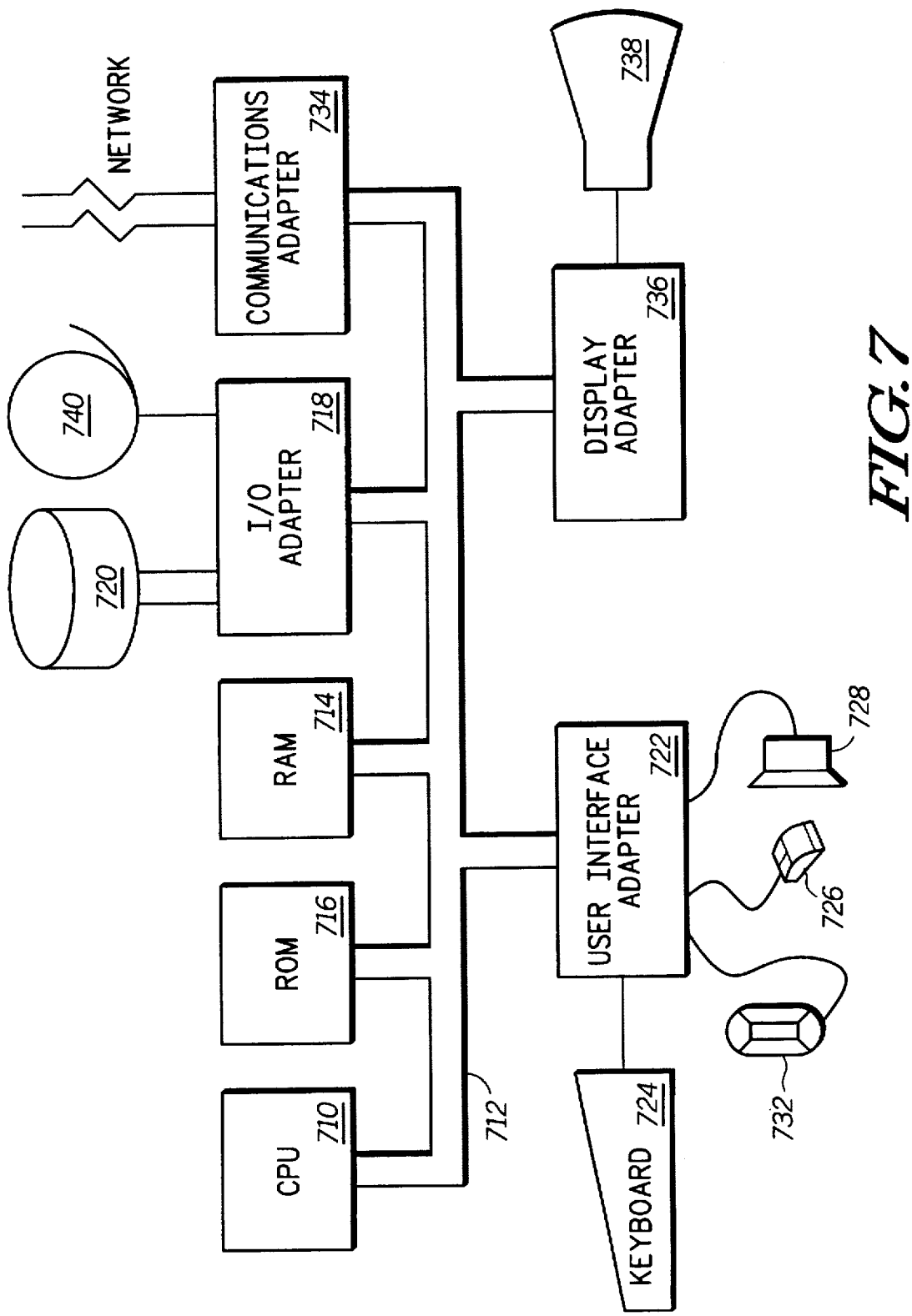
FIG. 7 illustrates a data processing system adaptable for storing and operating embodiments of the present invention.
Figure 8:
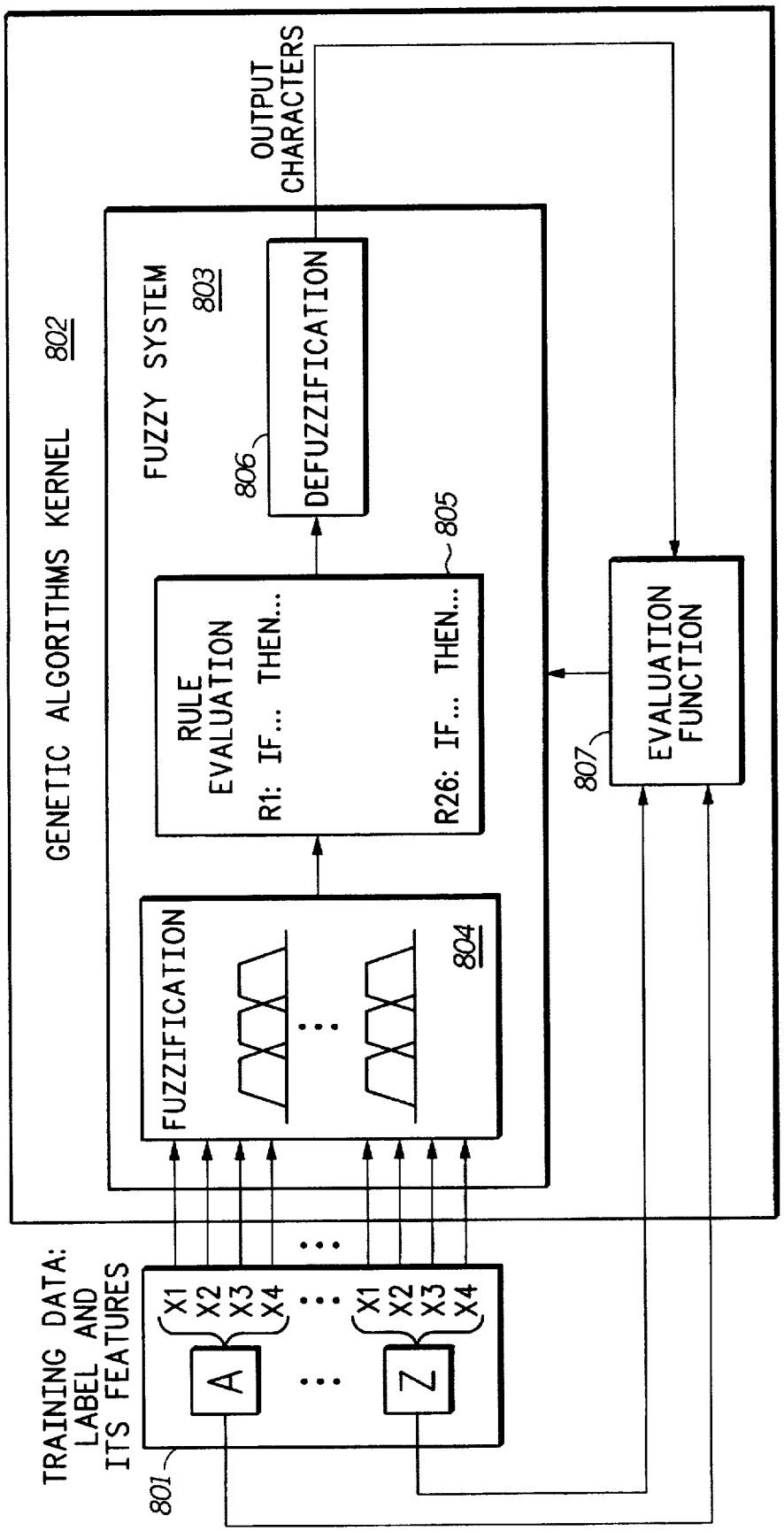
FIG. 8 illustrates a block diagram in accordance with the present invention.

Referring next to FIG. 8, there is illustrated a block diagram further depicting the present invention. As discussed above with respect to FIG. 2, training data for alphanumeric characters to be recognized by an OCR fuzzy logic system is produced in block 801, which shows the training vectors created and delivered to block 803 within block 802. Block 802 represents the genetic algorithms kernel which has been described above with respect to FIGS. 1 and 5. Block 803 represents a fuzzy logic system implemented within a data processing system as described below with respect to FIG. 7. Fuzzy logic system 803 is to be designed and tuned with the training data and the chromosomes produced by the genetic algorithms kernel 802. Fuzzy logic system 803 includes typical fuzzification 804, rule evaluation 805, and defuzzification 806 portions.

As described above with respect to FIG. 6, chromosomes representing the membership functions and rules are placed in the model of fuzzy logic system 803. The training data from block 801 is used to test the fuzzy logic model for each chromosome, resulting in the output of characters from fuzzy system 803. These output results for each chromosome are then evaluated against the actual data in evaluation function block 807. Results of this evaluation function, as described above, are then reinserted into the genetic algorithms kernel 802 and fuzzy logic system 803 if the fuzzy logic models for any chromosomes do not correctly recognize all of the characters.

The process of the present invention may be implemented within a data processing system as illustrated and described below with respect to FIG. 7. Furthermore, a parallel processing machine may be utilized to speed up the process illustrated with respect to FIG. 6 by allowing for the simultaneous production and evaluation of chromosomes in parallel.

Note, the genes within each of the chromosomes may be comprised of binary data, integers or floating point numbers.

For a further discussion of the present invention, please refer to C. C. Hung, *"Genetic Algorithms for Constructing and Tuning Fuzzy-Logic Control System,"* The Second International Conference on Fuzzy Logic Systems, Development Tools and Applications, September 1994, which is hereby incorporated by reference herein.

A representative hardware environment for practicing the present invention is depicted in FIG. 7, which illustrates a typical hardware configuration of a workstation in accordance with the subject invention having central processing unit 710, such as a conventional microprocessor, and a number of other units interconnected via system bus 712. The workstation shown in FIG. 7 includes random access memory (RAM) 714, read only memory (ROM) 716, and input/output (I/O) adapter 718 for connecting peripheral devices such as disk units 720 and tape drives 740 to bus 712, user interface adapter 722 for connecting keyboard 724, mouse 726, speaker 728, microphone 732, and/or other user interface devices such as a touch screen device (not shown) to bus 712, communication adapter 734 for connecting the workstation to a data processing network, and display adapter 736 for connecting bus 712 to display device 738.

Each of the foregoing described portions of the present invention, including the production of the training data, the LVQ network, the GA and the fuzzy logic system may be implemented within the data processing system illustrated in FIG. 7.

Software code for implementing the present invention is provided herein in Appendix A.

Although the present invention and its advantages have been described in detail, it should be understood that various changes, substitutions and alterations can be made herein without departing from the spirit and scope of the invention as defined by the appended claims.

Appendix A

```
/*****************************************************
* Genetic Algorithm (GA) package
*
*  ga.c ( Main GA kernel)
*
* Author: Chuan-Chang Hung
*
* Version: 1.0
* Date: Dec 3, 1993, in Motorola.
*
*****************************************************/
#include <stdio.h>
include <stdlib.h>
#include <ctype.h>
#include "ga.h"
#include "ga_global.h"
#include "ga_func.h"
void
GASystem( )
{
int        i, diff_num;
Chro_Type  mother, father, child;
/*********************
      Setup signal handlers.
*********************/
setup_signal();
/********************************
      Seed the Random Number Generator
********************************/
srandom(RS);
/*********************************************
      Allocate by a genetic population referenced the global Pool
*********************************************/
POP = allocate_pop(PS, SL);
if (POP == NULL) {
     printf(
    "Sorry I can not allocate a genetic population from the disk\n");
     exit(1);
     }
/******************************************
Initialize the genetic poulation with data.
******************************************/
init_pop(INIT_POP, POP, 0, POP->size, eval);
```

Appendix A

```
/*******************************
Rank the initial genetic population data.
*******************************/
rank_pop(POP);
/*******************************
Allocate temporary storage for parents of reproduction.
*******************************/
mother = allocate_chro(POP->string_length);
father = allocate_chro(POP->string_length);
/*******************************
    Evolution !!!
*******************************/
for (CG = 0; CG < NG; CG++) {
    /*******************************
    Choose two chromosomes for reproduction.
    *******************************/
    chose_parents(mother, father, POP, linear, CC);
/*******************************
Reproduce using the 'reduced surrogate crossover' operator. A
difference factor (actually, the hamming distance) between the two
parents is returned.
*******************************/
    diff_num = crossover(mother->string,
            father->string, POP->string_length);
/*******************************
    Mutate the child according to the difference between
    its parents (if mutation is turned on)
*******************************/
    if (MR > 0.0)
        mutate(mother->string,POP->string_length,diff_num,MR,CG);
/*******************************
Choose one of the two offspring to insert into the genetic pool.
*******************************/
    child = ((chro_bit() == 0) ? mother : father);
    /*******************************
    Evaluate the performance of new generation
    *******************************/
    child->perf = eval(child->string, SL);
/*******************************
Insert new chromosome into population according to its worth
*******************************/
    insert_chro(child, POP);
```

Appendix A

```
/*******************************************************
 * print the current status of generation according to the
 *              Status Interval being set
 *******************************************************/
        if (SI && !(CG % SI))
                print_status_screen(stdout, POP, CG);
        }

/*******************************************************
        allocate the memory of best chromosome
*******************************************************/
Best_Chro = allocate_chro(POP->string_length);
/*******************************************************
copy the best performance (randk 1) of string to Best_Chro
*******************************************************/
copy_chro(Best_Chro, &POP->strings[0], POP->string_length);
}
```

Appendix A

```
/***********************************************************
*       Genetic Algorithm (GA) package
*
*       pop.c: (referred from GENITOR)
*
*       Author: Chuan-Chang Hung
*
*       Version: 1.0
*       Date: Dec 3, 1993, in Motorola.
*
***********************************************************/
#include <stdlib.h>
include <stdio.h>
#include <malloc.h>
#include "ga.h"
#include "ga_global.h"
#include "ga_func.h"
#include "fuzzy.h"
static unsigned long next = 1;
/* May define my own random generator */
void osrand(int i)
{
      next = i;
}
int orand()
{
return((int) ((next = (next * 23) % 100000001) % RND_MAX));
} void init_random(int i)
{
      if (!i)
            osrand((int) time(NULL));
      else
            osrand(i);
}
```

Appendix A

```
/*****************************************************
*    This function is used to randomize the population for BIN
*    type of data. If types ==1 execute this type of randomization
*****************************************************/
void
BIN_INIT(Chro_Data string[], int length)
{
int      i;
for (i = 0; i < length; i++)
     string[i] = chro_bit_c();  /* generate a '1' or a '0' */
}

/*****************************************************
*    This function is used to randomize the population for float
*    type of data
*****************************************************/
void
FLOAT_INIT(Chro_Data string[], int length)
{
int      i;
for (i = 0; i < length; I++)
     string[i] = (fracrand() - 0.5) * 2;
     /* Generate number * between -1 and +1 */
}
```

Appendix A

```
/*************************************************************
 *    This function is used to randomize the population for integer
 *    type of data.
 *************************************************************/
void
INT_INIT(Chro_Data string[], int num_points)
{
static int  first_time = 1;
static Chro_Data_Type temp;
int         remainder;
int         next, I;

if (first_time) {
      if ((temp = (Chro_Data_Type)
                  malloc(num_points * sizeof(Chro_Data))) == NULL)
            fprintf(stdout, "malloc failure for INTEGER_INIT( )\n");
      first_time = 0;
      }
for (i = 0; i < num_points; i++)
      temp[i] = (Chro_Data) i + 1;
remainder = num_points - 1;
for (i = 0; i < num_points; i++) {
      next = random_int(remainder, 0);
      string[i] = temp[next];
      temp[next] = temp[remainder];
      remainder--;
      }
}
```

Appendix A

```c
/*****************************************************
 *   This is function is used to randomize the population
 *   of data for fuzzy-logic system
 *****************************************************/
void
FLOAT_INT_INIT(Chro_Data string[], int length)
{
int   i, j, k, l;
int   input_mem_end =0;
      /* the ending position for points of input M.F. */
int   out_mem_end;
      /* the ending position for points of output M.F. */
int   rules_length;   /* total length of antecedent and
              * consequent for all rules */ int       temp;

rules_length = nRule * (In + Out);
out_mem_end = length - rules_length;
for(i=0; i< In; i++)
      input_mem_end += InPoints*InMem[i];
for (i = 0; i < input_mem_end; i++)
      {
      string[i] = (int) (fracrand() * 255.0);
/* Generate number between 0 to +1 for points of input membership
function */
      }
for (j = input_mem_end; j < length; j = j + In + Out) {
      for (k = 0; k < In; k++) {
              string[j + k] = (int) (fracrand() * InMem[k]);
                  /* Generate index of antecedent of rule */
              }
      for (l = 0; l < Out; l++) {
              string[j+In+l] = (int) (fracrand() * OutMem[l]);
              /* Generate index of consequent of rule */
              }
      }
}
```

Appendix A

```
/*****************************************************
 * This function is deallocate memory for the structures of a genetic
 * population which was generated by allocate_pop().
 *****************************************************/
void
Free_pop(Pop_Type pop, int startpt)
{
int              i;
for (i = startpt; i < pop->size; I++)
    if (pop->strings[i].string)
        free(pop->strings[i].string);
    /***********************************
    The population structure should only be
    freed when all chromosomes have been freed
    ***********************************/
    if (!startpt) {
        free(pop->strings);
        free(pop);
        }
    /******************
    Update pool's size
    ****************/
    else {
        pop->size = startpt;
    }
}

/*****************************************************
 * This function is used to allocate a chromosome and string space
 *****************************************************/
Chro_Type
allocate_chro(int  string_length)
{
Chro_Type chromo;

if (((chromo = (Chro_Type) malloc(sizeof(Chro))) == NULL)
    || ((chromo->string =
    (Chro_Data_Type) malloc((string_length + 1)
    * sizeof(Chro_Data))) == NULL) )
    printf("malloc failue in alloacte_chro()\n");
return (chromo);
}
```

Appendix A

```c
/*************************************************
* This function is used to allocate the memory for the chromosome
*         structure of a genetic population
*************************************************/
Chro_Type
allocate_pop_strings(int pop_size, int string_length)
{
int i;
Chro_Type pop_strings;

pop_strings = (Chro_Type) malloc(pop_size * sizeof(Chro));
if (pop_strings == NULL) {
      printf(
      "Malloc for pop_strings falied in allocate_pop_strings( )\n");
      exit(1);
      }
for (i = 0; i < pop_size; i++) {
      if (!(pop_strings[i].string
            = (Chro_Data_Type) malloc((string_length + 1)
               * sizeof(Chro_Data)))) {
printf("Malloc has failed in this allocate_pop_strings( )\n");
printf("i=%i, sizeof(Chro_Data)=%i,strlen = %i\n",
      i,sizeof(Chro_Data),string_length);
            exit(1);
            }
      }
      return (pop_strings);
}
```

Appendix A

```
/************************************************************
 * This function is used to allocate memory for the popualtion
 *      string  structure
 ************************************************************/
Pop_Type
allocate_pop(int pop_size, int string_length)
{
Pop_Type  pop_temp;
pop_temp = (Pop_Type) malloc(sizeof(Pop));
if (pop_temp == NULL) {
      printf("Malloc for pop_temp failed in allocate_pop\n");
      exit(1);
      }
pop_temp->size = pop_size;
pop_temp->string_length = string_length;
if ((pop_temp->strings
      = allocate_pop_strings(pop_size, string_length)) == NULL) {
      printf(
      "Malloc for pop_temp->strings failed in allocate_pop\n");
      exit(1);
      }
      return (pop_temp);
}
```

Appendix A

```c
/***********************************************************
 * This function is used to give initial values to genetic population
 ***********************************************************/
int init_pop(char *file_seed, Pop_Type pop, int startpt, int stoppt,
float (*perf_fun) ())
{
        int      init_num;
        int      init_rand_num;
        FILE     *fp;
        fp = fopen(file_seed, "rb");
        / *
         * if (strlen (file_seed) == 0) init_num =  init_rand_pop (pop,
         * startpt, stoppt, perf_fun); else
         * /
        if (fp == NULL) {
               init_num = init_rand_pop(pop, startpt, stoppt, perf_fun);
               fprintf(stdout,
                      "\n%d chromosomes will be randomly generated\n",
                      init_num);
        } else {
               init_num =
                      set_init_pop(fp, pop, startpt, stoppt, perf_fun);
               fprintf(stdout,
                      "\n%d chromosomes will be randomly generated\n",
                      init_num - stoppt); }
               if (init_num < 0)
                      fprintf(stdout, "bad initialization indices");
        /***********************************************
               If file did not contain enough initialization
               values which compared with original pop, using random
               initialization to finish them
        ***********************************************/
        if (init_num != stoppt - startpt) {
               fprintf(stdout,
                      "\n%d chromosomes will be randomly generated\n",
                             stoppt - init_num);
               init_rand_num =
                      init_rand_pop(pop, init_num - 1, stoppt, perf_fun);
               init_num += init_rand_num;
        }
        fclose(fp);
        return (init_num);
}
```

Appendix A

```
/*************************************************************
 * This function is used to insert a new chromosome into population
 * and replace worst chromosome in population
 *************************************************************/
void
insert_chro(Chro_Type new_chro, Pop_Type pop)
{
        int         i, high, mid, low;
        int         rank;
        Chro        move_down, tmp;
/* new chromosome is not good  we do not want to use it */
if (new_chro->perf > pop->strings[pop->size - 1].perf)
        return;
/* do a binary search to find the rank of the new chromosome */
        high = 0;
        mid = pop->size / 2;
        low = pop->size - 1;
        rank = -1;
        while (rank == -1) {
/* 4 cases are used to find a new location for new chromosome */
if (new_chro->perf <= pop->strings[high].perf)
        rank = high;
else if (new_chro->perf == pop->strings[mid].perf)
        rank = mid;
else if (new_chro->perf == pop->strings[low].perf)
        rank = low;
else if (low - high <= 1)
        rank = low;

/** 2 cases are used to move the search indices since a new
 * location has not yet been found. */
else if (new_chro->perf < pop->strings[mid].perf) {
        low = mid;
        mid = high + ((low - high) / 2);
        }
else {          /* (new_chro->perf > pop->strings[mid].perf) */
        high = mid;
        mid = high + ((low - high) / 2);
        }
}

/*
 * Move every chromosome one down position from rank to make room
```

-12-

Appendix A

```
* for new_chromosome */
{
/*
 * copy new chromosome into pool storag and replace worst
 * chromosome in population
 */
        copy_chro(&pop->strings[pop->size - 1],
                    new_chro, pop->string_length);
        move_down.string = pop->strings[pop->size - 1].string;
        move_down.perf = pop->strings[pop->size - 1].perf;
        for (i = rank; i < pop->size; i++) {
                tmp.string = pop->strings[i].string; tmp.perf =
                    pop->strings[i].perf;
                pop->strings[i].string = move_down.string;
                pop->strings[i].perf = move_down.perf;
                move_down.string = tmp.string;
                move_down.perf = tmp.perf;
                }
        }
}

/****************************************************
 * This function is used to randomly initialize the string data of a
 * GA population; and also register the performance of each randomly
 * created string.
 ****************************************************/
int
init_rand_pop(Pop_Type pop, int startpt, int stoppt, float
(*perf_fun) ()) {
int        I;
for (i = startpt; i < stoppt; i++) {
        INIT(pop->strings[i].string, pop->string_length);
        pop->strings[i].perf =
            (*perf_fun) (pop->strings[i].string, pop->string_length); }
return (stoppt - startpt);
}
```

-13-

Appendix A

```c
/*************************************************
 * This function is used to set population of GA with initial values
 *      and performance values
 *************************************************/
int
set_init_pop(FILE * fp, Pop_Type pop, int startpt, int stoppt, float
(*perf_fun) ()) {
int         i, j;
float       val;
Chro_Data temp;
for (i = startpt; i < stoppt; i++) {
      for (j = 0; j < pop->string_length; j++) {
      if (fread(&pop->strings[i].string[j],sizeof(Chro_Data),1,fp)!=1)
            return (i);
            }
      if (fread(&val, sizeof(float), 1, fp) != 1)
            return (i);
      if (perf_fun) {
            pop->strings[i].perf =
            (*perf_fun) (pop->strings[i].string, pop->string_length);
            }
      else {
            pop->strings[i].perf = val;
            }
            fgetc(fp);
      }
return (stoppt - startpt);
}
```

Appendix A

```
/************************************************************
 * This function is used to rank the population according to their
 *     performance from lowest to highest
 ************************************************************/
void
rank_pop(Pop_Type pop)
{
int     r, next, low;
Chro    tmp;
for (r = 0; r < pop->size - 1; r++) {
      low = r;
      for (next = (r + 1); next < pop->size; next++)
            if (pop->strings[next].perf < pop->strings[low].perf)
                  low = next;
                  /* exchange */
      if (low != r) {
            tmp.string = pop->strings[r].string;
            tmp.perf = pop->strings[r].perf;
            pop->strings[r].string = pop->strings[low].string;
            pop->strings[r].perf = pop->strings[low].perf;
            pop->strings[low].string = tmp.string;
            pop->strings[low].perf = tmp.perf;
            }
      }
}
```

Appendix A

```
/****************************************************
 * Genetic Algorithm (GA) package
 *
 * allocate.c:
 *
 * Author: Chuan-Chang Hung
 *
 * Version: 1.0
 * Date: Dec 3, 1993, in Motorola.
 *
 ****************************************************/
#include <stdio.h>
include <stdlib.h>
#include <string.h>
#include <ctype.h>
#include "ga.h"
#include "ga_global.h"
#include "ga_func.h"
/********* Routine file matrix   and vector allocate *********/
void
VectorAllocate(VECTOR * vector, int nCols)
{
if ((*vector = (VECTOR) calloc(nCols, sizeof(int))) == NULL) {
     fprintf(stderr, "Sorry! Not enough memory for nodes \n");
     exit(1);
     }
}
void
AllocateCols(PINT matrix[], int nRows, int nCols)
{
     int        i;
     for (i = 0; i < nRows; i++)
          VectorAllocate(&matrix[i], nCols);
}
void
MatrixAllocate(MATRIX * pmatrix, int nRows, int nCols)
{
if ((*pmatrix = (MATRIX) calloc(nRows, sizeof(PINT))) == NULL) {
     fprintf(stderr, "Sorry! dynamic stack allocation overflow\n");
     exit(1);
     }
AllocateCols(*pmatrix, nRows, nCols);
}
```

Appendix A

```c
/* free space for the 2-dim dynamic array */
void
MatrixFree(MATRIX matrix, int nRows)
{
int        I;
for (i = 0; i < nRows; i++) free(matrix[i]);
     free(matrix);
}
/* For the floating point matrices pointer allocation */
void
FVectorAllocate(FVECTOR * fvector, int nCols)
{
if ((*fvector = (FVECTOR) calloc(nCols, sizeof(float))) == NULL) {
     fprintf(stderr, "Sorry! Not enough memory for float nodes \n");
     exit(1);
     }
}
void
FAllocateCols(PFLOAT fmatrix[], int nRows, int nCols)
{
int        i;
for (i = 0; i < nRows; i++)
     FVectorAllocate(&fmatrix[i], nCols);
}
void
FMatrixAllocate(FMATRIX * fpmatrix, int nRows, int nCols)
{
if ((*fpmatrix = (FMATRIX) calloc(nRows, sizeof(PFLOAT))) == NULL)
{
     fprintf(stderr, "Sorry! dynamic allocation failure\n");
     exit(1);
     }
FAllocateCols(*fpmatrix, nRows, nCols);
}
/* free space for the 2-dim dynamic array */
void
FMatrixFree(FMATRIX fmatrix, int nRows)
{
     int        i;
     for (i = 0; i < nRows; i++)
          free(fmatrix[i]);
     free(fmatrix);
}
```

Appendix A

```c
/*****************************************************
 * Genetic Algorithm (GA) package
 *
 * select.c (referred from GENITOR)
 *
 * Author: Chuan-Chang Hung
 *
 * Version: 1.0
 * Date: Dec 3, 1993, in Motorola.
 *
 *****************************************************/
#include <stdio.h>
include <stdlib.h>
#include <math.h>
#include "ga.h"
#include "ga_global.h"
#include "ga_func.h"
/*****************************************************
 * This is function is used to generate random integer between 0 and
 *     input max number using input linear bias
 *           ALGORITHM: (Joan Kauth)
 *           See Knuth vol 2 pg 102.
 *              Probability distribution function is:
 *                  f(x) = bias - 2(bias - 1)x
 *              bias = (prob of first rule) / (prob of middle rule)
 *****************************************************/
int
linear(int max, float chance)
/* chance:   y-intercept of linear distribution */
{
int        index;  /* index between 0 and pop_size */
double            sqrt();
index = max * (chance - sqrt(chance * chance - 4.0 * (chance - 1) *
              fracrand())) / 2.0 / (chance - 1);
printf("%d\n", index);
return (index);
}
```

-18-

Appendix A

```
/******************************************
 * This function is used to select two chromosomes from the
 * population according to chance described by input parameters
 ******************************************/
void     chose_parents(Chro_Type mother, Chro_Type father,
Pop_Type pop, int (*chance_fun) (int max, float chance), float
chance)
{
int      one, two;
one = (*chance_fun) (pop->size, chance);
two = (*chance_fun) (pop->size, chance);
if (pop->size > 1)
while (one == two)
two = (*chance_fun) (pop->size, chance);
copy_chro(mother, &pop->strings[one], pop->string_length);
copy_chro(father, &pop->strings[two], pop->string_length);
}
/******************************************
 * This function is used to copy one chromosome to another
 ******************************************/
void
copy_chro(Chro_Type str1, Chro_Type str2, int string_length)
{
int      i;
for (i = 0; i < string_length; i++)
     str1->string[i] = str2->string[i]; str1->perf = str2->perf;
}
```

-19-

Appendix A

```c
/*************************************************
 * Genetic Algorithm (GA) package
 *
 * signals.c:
 *
 * Author: Chuan-Chang Hung
 *
 * Version: 1.0
 * Date: Dec 3, 1993, in Motorola.
 *
 *************************************************/
#include <stdio.h>
include <stdlib.h>
#include <signal.h>
#include "ga.h"
#include "ga_global.h"
#include "ga_func.h"
/*
 * This function is used to be called as special handler for the
 * operating system signal
 */
void
interrup_dump(int sign, char *addr)
{
FILE        *fp;
fprintf(stdout, "\n (%d) Signal Received from User. Dumping Current Status of GA ...\n", sign);
/* Print current GA state to screen */
print_status_screen(stdout, POP, CG);
/* Dump all GA info to file */ summary_pop(NEW_POP, POP, CG);
fprintf(stdout, "\n...Continuing Execution or Hit '<Ctrl> C' to exit.\n");
}
```

Appendix A

```
/************************************************
 * This function is used to register signal handling routines
 * and print message to the user
 ************************************************/
void
setup_signal(void)
{
          signal(SIGTSTP, interrup_dump);
          /* fprintf (stderr, "\nHit '<Ctrl> Z' to dump status.\n");
*/
}
/************************************************
 * Genetic Algorithm (GA) package
 *
 * status.c:
 *
 * Author: Chuan-Chang Hung
 *
 * Version: 1.0
 * Date: Dec 3, 1993, in Motorola.
 *
 ************************************************/ include <stdio.h>
include <stdlib.h>
#include "ga.h"
#include "ga_global.h"
#include "ga_func.h"
/************************************************
  This function is used to calculate the average value of current
  popolation performance
 ************************************************/
float
pop_avg(Pop_Type pop)
{
int       i;
double    sum_perf = 0.0;
if (pop->size == 0)
fprintf(stdout, "pop_avg: pop_size is zero.\n");
for (i = 0; i < pop->size; i++)
sum_perf += pop->strings[i].perf;
return ((float) sum_perf / pop->size);
}
```

Appendix A

```
/***********************************************************
* This function is used to print contents of chromosomes of
* population to input file from start_pt to start_pt+count
*
***********************************************************/ void
print_pop(FILE * fp, Pop_Type pop, int start_pt, int count)
{
int      i, j;
if (start_pt < 0)
      start_pt = 0;
if (count > pop->size)
      count = pop->size;
if (start_pt + count > pop->size) {
      start_pt = 0;
      count = pop->size;
      }
for (i = start_pt; i < count; i++) {
      for (j = 0; j < pop->string_length; j++)
            fwrite(&pop->strings[i].string[j],
      sizeof(Chro_Data), 1, fp);
      fwrite(&pop->strings[i].perf, sizeof(float), 1, fp);
      fputc('\n', fp);
      }
}
```

-22-

Appendix A

```c
/************************************************************
 * This function is used to print Best, Worst, Mean and Average
 * information for current generation
 ************************************************************/
void
print_status_screen(FILE * fp, Pop_Type pop, int curr_gener)
{
       int     lowest;
/* Get index to lowest ranking gene in poplulation. */
/* Use 2nd to last since last is buffer. */
       lowest = pop->size > 1 ? pop->size - 2 : 0;
       fprintf(fp, "%5d | Best: %f  Worst: %f  Avg: %f\n",
              curr_gener,
              pop->strings[0].perf,
              pop->strings[lowest].perf,
              pop_avg(pop));
}
/************************************************************
 This function is used to summary the final results  of the population
 and save them into file
 ************************************************************/
void
summary_pop(char file[], Pop_Type pop, int curr_gener)
{
       FILE      *fp;
         /* print_status_screen(stderr, pop, curr_gener); */
       fp = fopen(file, "wb");
       if (fp == NULL) {
              fprintf(stdout, "Can't open file %s", file);
              exit(-1);
              }
       print_pop(fp, pop, 0, pop->size);
       fclose(fp);
}
```

Appendix A

```c
/*********************
 * for DEBUG or TRACE *
 *********************/
void
pause()
{
    char        inp[50];
       fprintf(stderr, "Paused...type 'c <CR>' to continue.\n");
    fscanf(stdin, "%s", inp);
}
/***************************************************************
 * Genetic Algorithm (GA) package
 *
 * crossover.c: (referred from GENITOR)
 *
 * Author: Chuan-Chang Hung
 *
 * Version: 1.0
 * Date: Dec 3, 1993, in Motorola.
 *
 ***************************************************************/
#include <stdio.h>
include <stdlib.h>
#include <malloc.h>
#include "ga.h"
#include "ga_global.h"
#include "ga_func.h"
```

Appendix A

```c
/***********************************************************
 * This function is used to identify all positions in which the
 * parent strings differ. Crossover points are allowed only to occur
 * in these positions and form two new Childs.
 ***********************************************************/
int
crossover(Chro_Data st1[], Chro_Data st2[], int length)
{
        static char     first_time = 1;
                        /* Flag for first time in this routine */
        static int      *diff;    /* Array of differing positions */
        int     cross_point1;
                        /* Index into diff of 1st crossover point*/
        int     cross_point2;   /* Index into diff of 2nd crossover
                                 * point */
        int     tmp_cross_point;   /* Temporary for swap of
                                    * cross_points */
        Chro_Data       tmp;
                /* Temporary for swap of parent material */
        int     diff_num;       /* Number of different positions */
        int     i;
        if (first_time) {
                diff = (int *) malloc(length * sizeof(int));
                first_time = 0;
        }
        /* Find all different positions */
        diff_num = 0;
        for (i = 0; i < length; i++)
                if (st1[i] != st2[i])
                        diff[diff_num++] = i;
/*
 * If there is only one difference between parents, a cross will
 * only result in a duplicate... so don't bother */
        if (diff_num <= 1)
                return (diff_num);
/*
 * Note that after crossover, st1 & st2 will instead contain children
 */
#define crossover(X)    {tmp = st1[X]; \
                                st1[X] = st2[X]; \
                                st2[X] = tmp; }
        /* Select two crossover indices */
cross_point1 = random_int(diff_num - 1, 0); cross_point2 =
```

Appendix A

```
random_int(diff_num - 1, 0);
     /* make sure cross_point1 is less than cross_point2 */
if (cross_point2 < cross_point1) { tmp_cross_point = cross_point1;
     cross_point1 = cross_point2; cross_point2 = tmp_cross_point;
}

/* careful not to alter cross_point out of array bounds */
else if (cross_point2 == cross_point1) {
     if (cross_point1 == 0)
          cross_point2 = 1;
     else
          cross_point1--;
     } else
          /* cross_point1 < cross_point2 */
          /* Crossover; we'll try to exchange the smaller set of
chromosomes */
          /* between crossover points, inclusive */
if (diff_num > 2 * ((cross_point2 - cross_point1) + 1)) {
for (i = cross_point1; i <= cross_point2; I++); crossover(diff[i])}
     /* outside of crossover points, inclusive */
else {
     for (i = 0; i <= cross_point1; i++)
          crossover(diff[i]);
     for (i = cross_point2; i < diff_num; i++)
     crossover(diff[i]);
     }
     return (diff_num);
}
```

-26-

Appendix A

```
/***********************************************************
 * Genetic  Algorithm (GA) package
 *
 * mutate.c:
 *
 * Author: Chuan-Chang Hung
 *
 * Version: 1.0
 * Date: Dec 3, 1993, in Motorola.
 *
 ***********************************************************/
include <stdio.h>
include <stdlib.h>
#include <math.h>
#include "ga.h"
#include "ga_global.h"
#include "ga_func.h"
/***********************************************************
 * This function is used to determine the appropriate mutation level
 *     for a child according to the hamming distance between its two
 *     parents: The less the difference, the greater the mutation rate
 ***********************************************************/
float
mutate_level(int diff_num, int length, float m_rate)
{
if (diff_num <= 1)
      return (m_rate);
else
      return (m_rate / ((diff_num / (float) length) * 100.0));
}
```

Appendix A

```
/****************************************************
 * This function is used to mutate the child according to the hamming
 *         distance between its two parents
 ****************************************************/
void
mutate(Chro_Data tmp[], int length, int diff_num, float m_rate,
            int current_generation)
{
int       i;
float     m_level;
/ *
 * The level of mutation a child undergoes is a function of the
 * relative number of differences between its two parents */ m_level = mutate_level(diff_num, length, m_rate);
      /* mutation of a given position flips the bit */
for (i = 0; i < length; i++)
      if (fracrand() < m_level)
            tmp[i] = MUTATE(tmp[i], current_generation);
}
/****************************************************
 *    This mutation formula is used to deal with binary value
 *    mutation
 ****************************************************/
Chro_Data
MUTATE_BIN(Chro_Data gene, int iteration)
{
                        if (gene == '1')
                                  gene == '0';
                        else
                                  gene == '1';
                        return (gene);
}
```

Appendix A

```
/*******************************************
  Define the probability of Delta being close to 0
  increases as t increases.
*******************************************/
double
Delta(int t, float range)
{
double          delta;
delta = range * (1 - pow(2 * fracrand(), pow((1 - t / NG), B)));
return (delta);
}

/*******************************************
*    This mutation formula is used to deal with the
*    mutation of data for integer
*******************************************/
Chro_Data
MUTATE_INT(Chro_Data gene, int iteration)
{
if (chro_bit() == 0)    /* if random digit is 0 */
      gene = (int) (gene + Delta(iteration, IUB - gene));
else
/* if random digit is 1 */
      gene = (int) (gene - Delta(iteration, gene - ILB));
return (gene);
}
/*******************************************
*    This mutation formula is used to deal with the
*    float point muataion
*******************************************/
Chro_Data
MUTATE_FLOAT(Chro_Data gene, int iteration)
{
if (chro_bit() == 0)    /* if random digit is 0 */
      gene = gene + Delta(iteration, FUB - gene);
else
/* if random digit is 1 */
      gene = gene - Delta(iteration, gene - FLB); return (gene);
}
```

Appendix A

```
/************************************************
*This mutation formula is used to deal with the mutation of data
* for float and integer type in fuzzy-logic system
************************************************/
Chro_Data
MUTATE_FLOAT_INT(Chro_Data gene, int iteration)
{
if (gene != (int) gene) {
gene = MUTATE_FLOAT(gene, iteration);
/* Muatate float point * data if gene is a * float point */
gene = MUTATE_INT(gene, iteration);
/* Mutate integer point * data if gene is a * integer point */
      }
else
      return (gene);
}
/************************************************
*     Genetic Algorithm (GA) package params.c)
*
*     Author: Chuan-Chang Hung
*
*     Version: 1.0
*     Date: Dec 3, 1993, in Motorola.
*
************************************************/ include <stdlib.h>
include <stdio.h>
#ifndef SEEK_SET
#define SEEK_SET 0
#endif
```

Appendix A

```
/*----------------------------------------
|   fsearch_beg() will search the file   |
|   pointed to by fp for the string      |
|   contained in search_str.  It returns |
|   -1 on failure and the offset from    |
|   the beginning of the file on success |
|   fsearch_beg() returns the offset for |
|   the first character in the string.   |
|----------------------------------------*/
long
fsearch_beg(FILE * fp, char *search_str)
{
        long       l;
        char       *buffer;
        char       c, fc;
        int        n = strlen(search_str);
buffer = (char *) malloc(sizeof(char) * (n + 1)); c = *search_str;
        while (1) {
while ((fc = fgetc(fp)) != EOF && fc != c); if (fc == EOF) {
                                free(buffer);
                                    return -1;
                }
                l = ftell(fp);
                fgets(buffer, n, fp);
                if (strcmp(search_str + 1, buffer) == 0) {
                        free(buffer);
                        return (l - 1);
                } else
                        fseek(fp, l, SEEK_SET);
        }
}
```

Appendix A

```
/*------------------------------------------
|    fsearch_end() will search the file  |
|    pointed to by fp for the string     |
|    contained in search_str. It returns |
|    -1 on failure and the offset from   |
|    the beginning of the file on success|
|    fsearch_beg() returns the offset for|
|    the last character in the string.   |
|----------------------------------------*/
long
fsearch_end(FILE * fp, char *search_str)
{
        long    i = fsearch_beg(fp, search_str);
        if (i == -1)
                return -1;
        else
                return (i + strlen(search_str));
}
/*
 * get_param() will look in a file for a section title and then a
 * specific parameter. If it cannot find the parameter, it fails.
 It returns: 0     : * Success
                -1  :       Failure to find section
                -2  :       Failure to find parameter
 * This function assumes space has been allocated for the
 * destination already.
 *
 */
int
get_param(FILE * fp, char *section, char *param, char *dest)
{
        long    l;
        int     n;
        l = fseek(fp, 0, SEEK_SET);
        l = fsearch_beg(fp, section);
        if (l == -1) {
                return -1;
        }
        l = fsearch_beg(fp, param);
        if (l != -1) {
                n = fscanf(fp, "%s", dest);
                if (!n)
                        return -1;
```

-32-

Appendix A

```
            else;
      } else
            return -1;
}
/*******************************************************
* fuzzy.c file: include all the functions for manipulate the
* procedures of fuzzy-logic system
*
* written by: C C Hung, Nov. 15, 1993
*******************************************************/
#include <stdio.h>
include <stdlib.h>
#include <math.h>
#include "ga.h"
#include "ga_global.h"
#include "ga_func.h"
#include "fuzzy.h"
#include "char.h"
#include "eval.h"
/*******************************************************
*Procedures of Fuzzy System:
*******************************************************/
void
FuzzySystem(int sample)
{
      int         i, j;
      float       control;
      Get_TrpMem(sample);
      /* get membership value from* Trpazoid MF */
      /* Inference from fuzzy min Operation */
      Inference();
      /* Defuzzification: */
      Max_Rule(sample) ;
}
```

Appendix A

```c
/****** read parametrs of fuzzy controller ******/ void
Read_Fuzzy_Param(void)
{
        int       in_index, out_index;
        int       max_mem_num = 0;
        char      param_file[20];
        char      buff[80];
        FILE      *fp;
        strcpy(param_file, "param.char");
        if ((fp = fopen(param_file, "r")) == NULL) {
                fprintf(stdout, "Cannot open the %s file\n", param_file);
                exit(1);
                }
        fscanf(fp, "%s %d %s %d\n", buff, &In, buff, &InPoints);
        VectorAllocate(&InMem, In);
                /* allocate the dynamic memory for
                 * the number of MFs of each input */
        for (in_index = 0; in_index < In; in_index++) {
                fscanf(fp, "%s %d\n", buff, &InMem[in_index]);
                }
        /*
         * chose the max number of membership functions among the inputs
         * in order to determine the max space to store the number of points
         * of input MF
         */
        for (in_index = 0; in_index < In; in_index++) {
                max_mem_num = max(max_mem_num, InMem[in_index]);
                }
MaxInMems = max_mem_num;
/* max number of MF of input variable */
MaxInPoints = max_mem_num * InPoints;
/* number of points for some
 * particular max number of
 * input membership function */ fscanf(fp, "%s %d %s %d\n", buff, &Out, buff, &OutPoints);
        VectorAllocate(&OutMem, 1);
         /* allocate the dynamic memory for
         * the number of MFs of outputs */ for (out_index = 0; out_index < 1; out_index++) {
                fscanf(fp, "%s %d\n", buff, &OutMem[out_index]);
                }
```

Appendix A

```c
/*
 * chose the max number of membership functions among the output
 * in order to determine the max space to store the number of
 * points of output MF
 */
        max_mem_num = 0;
        for (out_index = 0; out_index < 1; out_index++) {
        max_mem_num = max(max_mem_num, OutMem[out_index]);
        }
        MaxOutMems = max_mem_num;
                /* max number of MFs of output */
        MaxOutPoints = max_mem_num * OutPoints;
                /* number of points for some
                 * particular max number of
                 * output membership function */
        fscanf(fp, "%s %d\n", buff, &nRule);
        fscanf(fp, "%s %d\n", buff, &dim);
                /* number of inputs and outputs */
        fscanf(fp, "%s %d\n", buff, &nPattern);
                /* number of training patterns */
        fscanf(fp, "%s %d\n", buff, &Test_nPattern);
                /* number of testing patterns */
        fclose(fp);
}
/* Scaling the translated data to the orginal scale of the system */
void
Scale(void)
{
int  i, j;
for (i = 0; i < In; i++) {
        for (j = 0; j < InPoints * InMem[i]; j=j+2) {
                /*InPoint[i][j] = 255*InPoint[i][j]; */
                if(i==0)
                        InPoint[i][j] = (442-88)*InPoint[i][j]+88.0;
                else if(i==1)
                        InPoint[i][j] = (118-8)*InPoint[i][j]+8.0;
                else if(i==2)
                        InPoint[i][j] = (756-0)*InPoint[i][j];
                else if(i==3)
                        InPoint[i][j] = (188-0)*InPoint[i][j];
        }
    }
}
```

Appendix A

```
/********  Definition of Trapezoid M.F.   ******************/
float
Trapezoid(int sample, int i, int k)
{
int inp, slop1, slop2;
float temp1, temp2;
slop1 = (int) (InPoint[i][k+1]/10.0); slop2 = (int)
(InPoint[i][k+3]/10.0);
inp = (int) (Input[sample][i]);
/ *
printf("p1=%d p2=%d s1=%d s2=%d in=%d\n", (int) (InPoint[0][k]), \
      (int) (InPoint[0][k+2]), (int) (InPoint[0][k+1]/10.0), (int)
(InPoint[0][k+3]/10.0 ) , (int) Input[sample][0]);
* /
if (inp <= InPoint[i][k+2])  {
       temp2 = slop1*(inp - InPoint[i][k]);
       if (temp2 >=255.0)
             return(255.0);
       else if (temp2 < 0)
             return(0.0);
       else
             return(temp2);
       }
else if (inp > InPoint[i][k+2]) {
       temp2 = (slop2*(inp-InPoint[i][k+2]));
       if (temp2 >255)
             return(0.0);
       else
             return((255.0-temp2));
       }
}
```

Appendix A

```c
/********  Definition of Trapezoid M.F.  *******************/
float
Left_Trapezoid(int sample, int i, int k)
{
int inp, slop1, slop2;
float temp1, temp2;
InPoint[i][k+1] = 255.0;
slop2 = (int) (InPoint[i][k+3]/10.0);
inp = (int) (Input[sample][i]);
if (inp > InPoint[i][k+2]) {
      temp2 = (slop2*(inp-InPoint[i][k+2]));
      if (temp2 >255)
            return(0.0);
      else
            return((255.0-temp2));
      }
else if (inp <= InPoint[i][k+2])
      return(255);
} float
Right_Trapezoid(int sample, int i, int k)
{
int inp, slop1, slop2;
float temp1, temp2;
slop1 = (int) (InPoint[i][k+1]/10.0); InPoint[i][k+3] =255.0;
inp = (int) (Input[sample][i]);
if (inp <= InPoint[i][k+2])  {
      temp2 = slop1*(inp - InPoint[i][k]);
      if (temp2 >=255.0)
            return(255.0);
      else if (temp2 < 0)
            return(0.0);
      else
            return(temp2);
      }
else if (inp > InPoint[i][k+2])
      return(255.0);
}
```

Appendix A

```
/******* Get the membership value from the  Triangle Membership
function     ***********/
void
Get_TrpMem(sample)
{
      int              i, j, k;
      for (i = 0; i < In; i++) {
            for (j = 0, k = 0; j < InMem[i]; k += InPoints, j++) {
                        /* k is index of point MF */
                  if (j != 0 && j != (InMem[i]-1))
                              Mem[i][j] = Trapezoid(sample, i, k);
                  else if (j == 0)
                              Mem[i][j] = Left_Trapezoid(sample, i, k);
                  else
                              Mem[i][j] = Right_Trapezoid(sample, i, k);
                  }
            }
/ *
      for(i=0; i< 7; i++)
            printf("mem=%f\n",  Mem[0][i]);
* /
}
/************    Apply   the   AND   Operation   *****************/
void
Inference( )
{
      int              i, r;
      /* Initial Infere[r] to 1.0 */
      for (r = 0; r < nRule; r++)
            Infere[r] = 255.0;
      for (r = 0; r < nRule; r++) {
            for (i = 0; i < In; i++) {
                  Infere[r] = min(Infere[r], Mem[i][Antecedent[r][i]]);
                  }
            }
}
```

Appendix A

```
/******* Locate which rule has the maximum rule strength ****/
void
Max_Rule(int sample)
{
int   j,r, i,k;
float temp =0;
float check_rule[100];
int   num_rules;
k = -1;
for(r = 0; r< nRule; r++) {
        temp = max(Infere[r], temp);
      }
      for(i=0; i<1; i++) {
            for(r=0; r< nRule; r++) {
                  if (temp==0) {
/ *                       printf("r=%d\n",  r);
* /
                  Found_Char[sample] = (int) (fracrand( ) * OutMem[i]); }
                        else if(temp == Infere[r])
                              {
                              check_rule[k+1] = r;
                              k = k+1;
                              }
                  }
            }
      num_rules = (int) (fracrand( ) * k);
      if (k == 0)
            Found_Char[sample] = check_rule[0];
      else if (k > 0) {
            Found_Char[sample] = check_rule[num_rules]+100;
      }
}
```

Appendix A

```c
/*******************************************************
* char.c file: error functions
*
* written by: C C Hung, Decv. 15, 1993
********************************************************/
#include <stdio.h>
include <stdlib.h>
#include "ga.h"
#include "ga_global.h"
#include "ga_func.h"
#include "fuzzy.h"
#include "char.h"
#include "eval.h"
 #ifndef SEEK_SET
#define SEEK_SET 0
#endif
/******** This function is used to import patter matrx into input
matrix ***/
void initialize(int samples)
{
      int i, j;
       /* import input data from Pattern[] to Input[] matrix */
      for(i = 0; i< samples; i++)
            for(j=0; j< In; j++)
                  Input[i][j] = Pattern[i][j];
}
```

-40-

Appendix A

```
/* This function is used to normalize the source (src) data to the
desire (dse) range */
double normalize(double src_val, float src_min, float src_max, float
dse_min, float dse_max)
{
double dse_range, src_range;
double norm;
src_range = (double) (src_max - src_min);
dse_range = (double) (dse_max - dse_min);

if (src_range <= 0.0) /* prevent divide by zero error */
      {
      fprintf(stdout, "compute.c: normalize( ): src_min >= src_max");
      return(dse_min);
      }
else {
      norm = ((double) (src_val-src_min) * dse_range / src_range)
            + (double) dse_min;
      return(norm);
      }
}
```

Appendix A

```c
double denormalize(double dse_val, float src_min, float src_max,
float dse_min, float dse_max)
{
double dse_range, src_range;

src_range = (double) (src_max - src_min);
dse_range = (double) (dse_max - dse_min);
if (dse_range <= 0.0) /* prevent divide by zero error */
      {
      fprintf(stdout, "compute.c: normalize( ): dse_min >= dse_max");
      return(dse_min);
      }
else  {
      return ((double) (dse_val-dse_min)
            * dse_range / dse_range) + (double) dse_min;
      }
}
float     *
read_data(FILE *file, int dim)
{
int       i;
char      line[200];
int       done = 0;
float     *col;
int       line_num = 0;

col = (float *) malloc(400 * dim * sizeof(float));
if (col == NULL) {
      printf("Malloc for col failed in read_data()\n");
      exit(0);
      }
do {
      for (i = 0; i < dim; i++)
            if (fscanf(file, "%f", (col + line_num * dim + i)) == EOF) {
                  done = 1;
                  break;
                  }
            ++(line_num);
      } while (!done);
col = (float *) realloc(col, line_num * dim * sizeof(float));
return (col);
}
```

Appendix A

```c
/* array_min_max will find the min and max of every column in a
data file array. It returns a pointer to the mins and maxs in general
                    array_min_max[2n] = max of col n
                    array_min_max[2n+1] = min of col n */
float *array_min_max(FILE *file, int columns) {
/* return array of mins and maxs */
float *array;
/* temporary variables */
int i =0;
int NOT_EOF = 1;
float temp;

/* rewind the files */
fseek(file, 0L, SEEK_SET);
/* allocate space for mins and maxs */
array = (float *) malloc (2*columns*sizeof(float));
/* read in first line as default values of min and max */
for(i =0; i < columns; i++)
    {
    fscanf(file, "%f", &temp);
    array[2*i] = array[2*i+1] = temp;
    }
/* Now read in all other lines and compare to find mins and maxs */
while (NOT_EOF == 1)
    {
    for (i = 0; i < columns; i++)
        {
        if((NOT_EOF = fscanf(file, "%f", &temp)) != 1) break;
        if (temp> array[2*i])
            array[2*i]= temp;
        if (temp< array[2*i+1])
            array[2*i+1] = temp;
        }
    }
return array;
}
```

Appendix A

```c
/*This function is used to normalize input data to the same range */
void read_pattern(FILE *file, int samples)
{
int i, j;
float p;
float *data;
float *temp_array;
/* read data from input file */
data = read_data(file, dim);
/* locate the min and max of each dimemsion for all patterns */
temp_array = array_min_max(file, dim);
/*normalize input data into -1 to 1 */
for(i=0; i< samples; i++)
      {
      for(j = 0; j < In; j++)
            {
            Pattern[i][j] = normalize(*(data+i*dim+j),
                  temp_array[2*j+1], temp_array[2*j], 0, 255);
            }
      }
for(i=0; i< samples; i++)
      for(j = 0; j < 1; j++)
            Pattern[i][In+j] = *(data+i*dim+(In+j));
}
```

Appendix A

```c
/* This function is used to calculate the linear combination of
errors between real outputs and desired outputs over all patterns
and outputs and return error */
double Error_Linear(Chro_Data string[], int samples)
{
int     i, j, k;
float   temp;
double  errors = 0.0;

/*calcualte error between real nad desired output over all patterns
and outputs */
for(i =0; i < samples; i++)
    {
            /* call fuzy system to calculate output */
    FuzzySystem(i);
        / *       printf("found=%f\n", Found_Char[i]);     */
    if(Found_Char[i] != Pattern[i][ln])
        errors = errors+1;
            /* sum of errors of all patterns and outputs*/
    else
        errors = errors;
    }
return(errors);
}

/************************************************************
*
* eval.c: Evaluation function is used evaluate each chromosome
*           performance *
* Author: Chuan-Chang Hung
*
* Version: 1.0
* Date: Dec. , 1993, in Motorola.
*
************************************************************/
```

Appendix A

```c
/******************************************************/
#include <stdio.h>
include <stdlib.h>
#include <math.h>
#include "ga.h"
#include "ga_global.h"
#include "ga_func.h"
#include "fuzzy.h"
#include "char.h"
#include "eval.h"
float
eval(Chro_Data string[], int length)
{
int        i, j;
Chro_Data    temp;
double error;
for (i=0; i< (length-In*nRule); i=i+InPoints) {
    if (string[i] > string[i+2]){
        temp = string[i];
        string[i] = string[i+2]; string[i+2] = temp;
        }
    }
/* Transalte the string to the fuzzy system */
GA_To_Fuzzy(string,length);
/*    Scale( );   */
/*
* scaling the translated data from GA to the orginal required scale *
of the system
*/
    /* calculate error */
        error = Error_Linear(string, nPattern);
    /* average error per output node and over all patterns */
    /*error = sqrt((double) error/(nPattern * Out));
    */
return (error);
}
```

Appendix A

```
void Test_Report(Chro_Data string[], int length)
{
double error;
int i;
      /* translate the string to the fuzzy system */
GA_To_Fuzzy(string, length);
/ *    Scale( ); */
      /* calculate error from testing data */
error = Error_Linear(string, Test_nPattern);
      /* report accuracy of classfication */
fprintf(stdout, "\n< Calculate the accuracy of classification\n");

/* mean-square error*/
      /* error = sqrt((double) error/(Test_nPattern*Out));
      * /
printf("Classification Error = %lf\n", error);
}
```

-47-

Appendix A

```c
/***********************************************************
 * Translated.c: functions are used to decode the chromosome to
 fuzzy system *
 * Author: Chuan-Chang Hung
 *
 * Version: 1.0
 * Date: Dec 15, 1993, in Motorola.
 *
 ***********************************************************/
include <stdio.h>
include <stdlib.h>
#include "ga.h"
#include "ga_global.h"
#include "fuzzy.h"
#include "eval.h"
void
GA_To_Fuzzy(Chro_Data string[], int length)
{
int    i, j;
int    Final_InMem_break;      /* break point for final
                                * point of final input M F */
int    Final_OutMem_break;     /* break point for final
                                * point of final output MF */
int    Start_Conse_point;      /* Starting point of
                                * consequent of the first
                                * rule */
int    skip_space = 0;         /* skip sapces which have been stored
                                * into memory */
/*
 * store a individual from GA format to the data base in the fuzzy
 * system*/

/* store the values of  all points of each input MF  from GA */
for (i = 0; i < In; i++) {
      for (j = 0; j < InPoints * InMem[i]; j++) {
            InPoint[i][j] = string[j + skip_space];
            }
      skip_space += j;
      }
Final_InMem_break = skip_space;
skip_space = 0;         /* reset this point to 0 */
      /* store the values of all points of each output MF from GA */
for (i = 0; i < Out; i++) {
```

-48-

Appendix A

```
        for (j = 0; j < OutPoints * OutMem[i]; j++) {
            OutPoint[i][j] = string[j + Final_InMem_break + skip_space]; }
        skip_space += j;
        }
/* store the antecedents of all rules from GA */
for (i = 0; i < nRule; i++) {
        for (j = 0; j < In; j++) {
                Antecedent[i][j] = string[j + Final_InMem_break
                                    + skip_space];
            }
        skip_space += In + Out;
                /* skip antecedent and consequent in a given rule */
        }
Start_Conse_point = Final_InMem_break + In;
                    /* the starting point of
                     * consequent of first
                     * rule */
skip_space = 0;
        /* store the consequents of all rules from GA */
for (i = 0; i < nRule; i++) {
        for (j = 0; j < Out; j++) {
                Consequent[i][j] = string[j + Start_Conse_point
                                    + skip_space];
            }
        skip_space += In + Out; /* skip antecedent and consequent in
                        * a given rule */
        }
}
```

-49-

Appendix A

```c
/****************************************************
 *
 * simu.c:
 *     main program of entire GA application for fuzzy logic system
 *
 * Author: Chuan-Chang Hung
 *
 * Version: 1.0
 * Date: Dec 17, 1993, in Motorola.
 ****************************************************/
#include <stdio.h>
include <stdlib.h>
#include "ga.h"
#include "ga_global.h"
#include "ga_func.h"
#include "fuzzy.h"
#include "char.h"
#include "eval.h"
void
main()
{
    int i,j;
    FILE *training;
    FILE *testfile;
/************ load the parameters of fuzzy system *********/
Read_Fuzzy_Param();
/********* load parameters of Genetic Algorithm ******/
Read_GA_Param();
/********* allocate dynamical memory for all patterns ****/
FMatrixAllocate(&Pattern, nPattern, dim);
FMatrixAllocate(&InPoint, In, MaxInPoints);
FMatrixAllocate(&OutPoint, Out, MaxOutPoints);
MatrixAllocate(&Antecedent, nRule, In);
MatrixAllocate(&Consequent, nRule, Out);
FMatrixAllocate(&Mem, In, MaxInMems);
FMatrixAllocate(&Input, nPattern, In);
FVectorAllocate(&Infere, nRule);
FVectorAllocate(&Found_Char, nPattern);
/******* generate the random seed */
/****** open training file *******/
training = fopen("temp", "r");
/****** convert training data to normalized data into
 * different range and store them into global
```

Appendix A

```c
 * two dimensional array********/
read_pattern(training, nPattern );
/*** close file */
fclose(training);
/*** initialize some matrixs for training purpose *******/
initialize(nPattern);
init_random(RS);
/**** Start to execute the evolution  process ******/
GASystem();
/*****************************
dump load new population
*****************************************/
summary_pop(NEW_POP, POP, CG);
fprintf(stdout, "\n");
/***** open test file *****/
testfile = fopen("temp.test", "r");
/******* convert test data to normalized data into different range
 * and store them into global two
 * dimensional array ********/
read_pattern(testfile, Test_nPattern);
/*** close test file */
fclose(testfile);
/***** initialize some matrixs for testing purpose **/
initialize(Test_nPattern);
/* report the accuracy of classfication by found model */
Test_Report(Best_Chro->string, SL);
/***** free population ******/
Free_pop(POP, 0);
/******* free all dynamic memory ***/
FMatrixFree(Pattern, nPattern);
FMatrixFree(InPoint, In);
FMatrixFree(OutPoint, Out);
MatrixFree(Antecedent, nRule);
MatrixFree(Consequent, nRule);
FMatrixFree(Mem, In);
FMatrixFree(Input, nPattern);
free(InMem);
free(OutMem);
free(Infere);
free(Max_Rule);
}
```

Appendix A

```
/***************************************************
 * Pre.c: The program for extracting the features of
 * the alphebet characters to generate the new inputs
 * of fuzzy system
 *
 * author: Chuan-Chang Hung
 *
 * First version: Sept. 23, 1994, Motorola
 * Refined Version: Oct. 5, 1994
 ***************************************************/
#include <stdlib.h>
include <stdio.h>
#include <math.h>
double    *Moment(double *data, int x_pixels, int y_pixels);
int
main(int argc, char *argv[])
{
FILE      *fp1;    /* pointer to input file */
FILE      *fp2;    /* pointer to output file */
int       done = 0;
int       i,j;
int        x_pixels = 16;  /* x-dimension of the image */
int        y_pixels;       /* y-dimension of the image */
int        line = 0;       /* counter of vertical line of image */
double    *converted_data;
/* convert the raw image data to the * inputs of fuzzy system */
double         *data;      /* space for pixel data of one image */
float     min_max_input[]
     = {94.63, 434.76,16.44, 112, 0, 748.26, 0, 180.49};
     /* min and max values of each input feature */
int            normalized_data[10];   /* data normalized into the
                                      * range of 0-255 */ if ((fp1 = fopen(argv[1], "r")) == NULL) {
     fprintf(stderr, "Sorry, I cannot open %s file\n", argv[1]);
     exit(1);
     }
if ((fp2 = fopen(argv[2], "w")) == NULL) {
     fprintf(stderr, "Error: Cannot open the %s outputfile\n",
          argv[2]); exit(1);
     }
data = (double *) malloc(16 * 16 * sizeof(double));
if (data == NULL) {
```

-52-

Appendix A

```
        printf("Malloc for data failed\n");
        exit(0);
        }
converted_data = (double *) malloc(8 * sizeof(double));
if (converted_data == NULL) {
        printf("Malloc for converted data failed\n");
        exit(0);
        }
/* read data from file and save into data pointer */
do {
        for (i = 0; i < x_pixels; I++)
                if (fscanf(fp1, "%lf", (data + line * x_pixels + i)) == EOF) {
                        done = 1;
                        break;
                        }
                ++(line);
        } while (!done);
y_pixels = line - 1;
converted_data = Moment(data, x_pixels, y_pixels);
/* normalize the feature data into [0, 255]
 * normalized data = ((input-min)/(max-min))*255   */
/* convert the normalized data into the format oif AE */
for (i = 0, j = 0; i < 4; i++, j = j + 2) {
        normalized_data[i] = (int) ( ((converted_data[i]
                - min_max_input[j]) \ /(min_max_input[j + 1]
                - min_max_input[j])) * 255);
        fprintf(fp2, "dc.b $%x,$%x,$%x,$%x,$%x,$%x,$%x\n",
                        normalized_data[i], normalized_data[i],
                        normalized_data[i], normalized_data[i],
                        normalized_data[i], normalized_data[i],
                        normalized_data[i]);
        }
/ *
        for (i = 0; i < 4 ; i++) {
        fprintf(fp2, "%lf ", converted_data[i]);
        }
        fprintf(fp2, "%s\n", argv[2]);
* /
}
```

Appendix A

```
/************************************
* This function is to apply imageing moment to extract
* the features. Here, we obtain 4 moment invariant
* features for rotation and translation invariant
*************************************/
double          *
Moment(double *data, int x_pixels, int y_pixels) {
int         i, j;
double      *output;  /* vector to store the extracted features */
int         total_pixels;
double      m00, m01, m10, m11, m20, m02, m12, m21, m30, m03;
double      u00, u01, u10, u11,u20, u02, u21, u12, u30, u03;
double      xx, yy;
double      mom5, mom6;

output = (double *) malloc(8 * sizeof(double));
if (output == NULL) {
        printf("Malloc for output data failed\n"); exit(0);
    }
m00 =0; m01 = 0; m10 =0; m11 = 0; m20=0; m02=0; m12 =0; m21=0;
m30=0, m03=0;

total_pixels = x_pixels * y_pixels;
        /*************** Features   Extractions  ************/
for (i = 0; i < y_pixels; i++) {
    for (j = 0; j < x_pixels; j++) {
        if(*(data+i*x_pixels+j)  == 1)
            *(data+i*x_pixels+j) =0;
/* calculate image moment based on zero-order to third order */
        m00 += (*(data+i*x_pixels+j))/ total_pixels;
        m01 += (i* (*(data+i*x_pixels+j))) / total_pixels;
        m10 += (j* (*(data+i*x_pixels+j))) / total_pixels;
        m11 += (i*j* (*(data+i*x_pixels+j))) /total_pixels;
        m20 += (j*j* (*(data+i*x_pixels+j))) /total_pixels;
        m02 += (i*i* (*(data+i*x_pixels+j))) /total_pixels;
        m21 += (j*j*i* (*(data+i*x_pixels+j))) / total_pixels;
        m12 += (j*i*i* (*(data+i*x_pixels+j))) /total_pixels;
        m30 += (j*j*j* (*(data+i*x_pixels+j))) /total_pixels;
        m03 += (i*i*i* (*(data+i*x_pixels+j))) / total_pixels;
        }
    }
/* calculate the center point */
xx = m10/m00;
```

Appendix A

```
yy= m01/m00;
/* calculate moment invariants */ u00 = m00;
u10 =0; u01 =0;
u20  = m20-u00*xx*xx;
u11  = m11 - u00*xx*yy;
u02  = m02-u00*yy*yy;
u30  = m30-3*m20*xx+2*u00*xx*xx*xx;;
u03  = m03-3*m02*yy+2*u00*yy*yy*yy;
u21  = m21-m20*yy-2*m11*xx+2*u00*xx*xx*yy;
u12  = m12-m02*xx-2*m11*yy+2*u00*xx*yy*yy;
/*     mom5 = ((u30-3*u12)*(u30+u12)*((u30+u12)*(u30+u12) -
3*(u21+u03)* (u21+u03))) + ((3*u21-u03) * (u21+u03) *
(3*(u30+u12)*(u30+u12) - (u21+u03)*(u21+u03)));
mom6 = ((u20-u02)*((u30+u12)*(u30+u12)
       - (u21+u03)*(u21+u03)))
       + (4*u11*(u30+u12)*(u21+u03));
if (mom5 < 0)
       mom5 =  -1*mom5;
if (mom6 < 0)
       mom6 = -1*mom6;
*/
/* calculate the feature of each character based on
*      image moment invariants */
output[0] = (u20+u02);
output[1] = sqrt(((u20-u02)*(u20-u02)+4*u11*u11));
output[2] =
       sqrt(((u30-3*u12)*(u30-3*u12)+(3*u21-u03)*(3*u21-u03)));
output[3] = sqrt(((u30+u12)*(u30+u12)+(u21+u03)*(u21+u03)));
return (output);
}
```

I claim:

1. A method for deriving parameters for a fuzzy logic system, wherein said fuzzy logic system is adapted for an optical character recognition ("OCR") system, and wherein said method comprises the steps of:

accessing a genetic algorithm to produce a plurality of chromosomes representing said parameters for said fuzzy logic system, said parameters including input membership functions and rules for said fuzzy logic system;

transforming each of said plurality of chromosomes into said parameters for said fuzzy logic system;

importing said parameters into said fuzzy logic system for said each of said plurality of chromosomes;

simulating said fuzzy logic system with respect to said each of said plurality of chromosomes, wherein said simulating step comprises the substeps of:

producing image data of characters to be recognized by said OCR system, inputting said image data into a learning vector quantization network to produce optimized moment invariant vectors associated with each of said characters, and inputting said optimized moment invariant vectors into said fuzzy logic system;

evaluating said simulations with respect to a threshold parameter; and selecting one of said plurality of chromosomes resulting from said evaluating step if said one of said plurality of chromosomes satisfies said threshold parameter.

2. A computer program product stored in a computer storage means, said computer program product operable for deriving parameters for a fuzzy logic system, wherein said fuzzy logic system is adapted for an optical character recognition ("OCR") system, said computer program product comprising:

means for accessing a genetic algorithm to produce a plurality of chromosomes representing said parameters for said fuzzy logic system, said parameters including input membership functions and rules for said fuzzy logic system;

means for transforming each of said plurality of chromosomes into said parameters for said fuzzy logic system;

means for importing said parameters into said fuzzy logic system for said each of said plurality of chromosomes;

means for simulating said fuzzy logic system with respect to said each of said plurality of chromosomes, wherein said simulating means further comprises:

means for producing image data of characters to be recognized by said OCR system, means for inputting said image data into a learning vector quantization network to produce optimized moment invariant vectors associated with each of said characters, and means for inputting said optimized moment invariant vectors into said fuzzy logic system;

means for evaluating said simulations with respect to a threshold parameter; and means for selecting one of said plurality of chromosomes resulting from said evaluating means if said one of said plurality of chromosomes satisfies said threshold parameter.

3. A data processing system comprising:

a fuzzy logic system, wherein said fuzzy logic system is adapted for an optical character recognition ("OCR") system; and means for running a genetic algorithm, said genetic algorithm operable for deriving parameters for said fuzzy logic system, said parameters including input membership functions and rules for said fuzzy logic system, said running means further comprising:

means for producing a plurality of chromosomes representing said parameters for said fuzzy logic system;

means for transforming each of said plurality of chromosomes into said parameters for said fuzzy logic system;

means for importing said parameters into said fuzzy logic system for said each of said plurality of chromosomes;

means for simulating said fuzzy logic system with respect to said each of said plurality of chromosomes, wherein said simulating means further comprises:

means for producing image data of characters to be recognized by said OCR system;

means for inputting said image data into a learning vector quantization network to produce optimized moment invariant vectors associated with each of said characters; and means for inputting said optimized moment invariant vectors into said fuzzy logic system;

means for evaluating said simulations with respect to a threshold parameter; and means for selecting one of said plurality of chromosomes resulting from said evaluating means if said one of said plurality of chromosomes satisfies said threshold parameter.

4. A method for deriving parameters for a fuzzy logic system adapted for an optical character recognition ("OCR") application, said method comprising the steps of:

producing image data of characters to be recognized by said OCR application;

inputting said image data into a learning vector quantization network to produce optimized moment invariant vectors associated with each of said characters;

accessing a genetic algorithm to produce a plurality of chromosomes representing said parameters for said fuzzy logic system;

transforming each of said plurality of chromosomes into said parameters for said fuzzy logic system;

importing said parameters into said fuzzy logic system for said each of said plurality of chromosomes;

simulating said fuzzy logic system with respect to said each of said plurality of chromosomes;

inputting said optimized moment invariant vectors into said fuzzy logic system;

with respect to said each of said plurality of chromosomes, determining how many of said characters are correctly recognized by said fuzzy logic system; and selecting one of said plurality of chromosomes if said one of said plurality of chromosomes correctly recognizes all of said characters.

5. The method as recited in claim 4, further comprising the step of:

feeding back said plurality of chromosomes into said genetic algorithm for reproduction if none of said plurality of chromosomes correctly recognize all of said characters.

6. The method as recited in claim 5, further comprising the steps of:

associating a score with said each of said plurality of chromosomes, said score indicating how many of said characters were recognized by said each of said plurality of chromosomes;

selecting a percentage of said plurality of chromosomes having better scores;

applying a crossover process between said selected percentage of said plurality of chromosomes to produce one or more children;

replacing one or more of said plurality of said chromosomes having worst scores with said one or more children, resulting in a new population of chromosomes;

transforming said new population into fuzzy logic parameters;

importing said fuzzy logic parameters of said new population into said fuzzy logic system;

simulating said fuzzy logic system with respect to said new population;

inputting said optimized moment invariant vectors into said fuzzy logic system;

with respect to each of said plurality of chromosomes in said new population, determining how many of said characters are correctly recognized by said fuzzy logic system; and selecting one of said plurality of chromosomes in said new population if said one of said plurality of chromosomes in said new population correctly recognizes all of said characters.

7. The method as recited in claim 4, wherein said parameters include input membership functions and rules for said fuzzy logic system.

8. A computer program product stored in a computer storage means, said computer program product operable for deriving parameters for a fuzzy logic system adapted for an optical character recognition ("OCR") application, said computer program product comprising:

means for producing image data of characters to be recognized by said OCR application;

means for inputting said image data into a learning vector quantization network to produce optimized moment invariant vectors associated with each of said characters;

means for accessing a genetic algorithm to produce a plurality of chromosomes representing said parameters for said fuzzy logic system;

means for transforming each of said plurality of chromosomes into said parameters for said fuzzy logic system;

means for importing said parameters into said fuzzy logic system for said each of said plurality of chromosomes;

means for simulating said fuzzy logic system with respect to said each of said plurality of chromosomes;

means for inputting said optimized moment invariant vectors into said fuzzy logic system;

with respect to said each of said plurality of chromosomes, means for determining how many of said characters are correctly recognized by said fuzzy logic system; and means for selecting one of said plurality of chromosomes if said one of said plurality of chromosomes correctly recognizes all of said characters.

9. The computer program product as recited in claim 8, further comprising:

means for feeding back said plurality of chromosomes into said genetic algorithm for reproduction if none of said plurality of chromosomes correctly recognize all of said characters.

10. The computer program product as recited in claim 8, further comprising:

means for associating a score with said each of said plurality of chromosomes, said score indicating how many of said characters were recognized by said each of said plurality of chromosomes;

means for selecting a percentage of said plurality of chromosomes having better scores;

means for applying a crossover process between said selected percentage of said plurality of chromosomes to produce one or more children;

means for replacing one or more of said plurality of said chromosomes having worst scores with said one or more children, resulting in a new population of chromosomes;

means for transforming said new population into fuzzy logic parameters;

means for importing said fuzzy logic parameters of said new population into said fuzzy logic system;

means for simulating said fuzzy logic system with respect to said new population;

means for inputting said optimized moment invariant vectors into said fuzzy logic system;

with respect to each of said plurality of chromosomes in said new population, means for determining how many of said characters are correctly recognized by said fuzzy logic system; and means for selecting one of said plurality of chromosomes in said new population if said one of said plurality of chromosomes in said new population correctly recognizes all of said characters.

11. The computer program product as recited in claim 8, wherein said parameters include input membership functions and rules for said fuzzy logic system.

12. The computer program product as recited in claim 8, wherein said parameters for said fuzzy logic system are configured for triangular membership functions.

13. The computer program product as recited in claim 8, wherein said parameters for said fuzzy logic system are configured for trapezoidal membership functions.

14. A computer system operable for deriving parameters for a fuzzy logic system adapted for an optical character recognition ("OCR") application, said computer system comprising:

means for producing image data of characters to be recognized by said OCR application;

means for inputting said image data into a learning vector quantization network to produce optimized moment invariant vectors associated with each of said characters;

means for accessing a genetic algorithm to produce a plurality of chromosomes representing said parameters for said fuzzy logic system;

means for transforming each of said plurality of chromosomes into said parameters for said fuzzy logic system;

means for importing said parameters into said fuzzy logic system for said each of said plurality of chromosomes;

means for simulating said fuzzy logic system with respect to said each of said plurality of chromosomes;

means for inputting said optimized moment invariant vectors into said fuzzy logic system;

with respect to said each of said plurality of chromosomes, means for determining how many of said characters are correctly recognized by said fuzzy logic system; and means for selecting one of said plurality of chromosomes if said one of said plurality of chromosomes correctly recognizes all of said characters.

15. The computer system as recited in claim 14, further comprising:

means for feeding back said plurality of chromosomes into said genetic algorithm for reproduction if none of said plurality of chromosomes correctly recognize all of said characters.

16. The computer system as recited in claim 14, further comprising:

means for associating a score with said each of said plurality of chromosomes, said score indicating how many of said characters were recognized by said each of said plurality of chromosomes;

means for selecting a percentage of said plurality of chromosomes having better scores;

means for applying a crossover process between said selected percentage of said plurality of chromosomes to produce one or more children;

means for replacing one or more of said plurality of said chromosomes having worst scores with said one or more children, resulting in a new population of chromosomes;

means for transforming said new population into fuzzy logic parameters;

means for importing said fuzzy logic parameters of said new population into said fuzzy logic system;

means for simulating said fuzzy logic system with respect to said new population;

means for inputting said optimized moment invariant vectors into said fuzzy logic system;

with respect to each of said plurality of chromosomes in said new population, means for determining how many of said characters are correctly recognized by said fuzzy logic system; and means for selecting one of said plurality of chromosomes in said new population if said one of said plurality of chromosomes in said new population correctly recognizes all of said characters.

17. The computer system as recited in claim 14, wherein said parameters include input membership functions and rules for said fuzzy logic system.

18. A software tool stored on a storage media said software tool operable for deriving parameters for a fuzzy logic system, wherein said fuzzy logic system is adapted for an optical character recognition ("OCR") system, and, said software tool comprising:

a first plurality of binary values for accessing a genetic algorithm to produce a plurality of chromosomes representing said parameters for said fuzzy logic system, said parameters including input membership functions and rules for said fuzzy logic system;

a second plurality of binary values for transforming each of said plurality of chromosomes into said parameters for said fuzzy logic system;

a third plurality of binary values for importing said parameters into said fuzzy logic system for said each of said plurality of chromosomes;

a fourth plurality of binary values for simulating said fuzzy logic system with respect to said each of said plurality of chromosomes, wherein said fourth plurality of binary values for simulating said fuzzy logic system with respect to said each of said plurality of chromosomes further comprises:

a seventh plurality of binary values for producing image data of characters to be recognized by said OCR system, an eighth plurality of binary values for inputting said image data into a learning vector quantization network to produce optimized moment invariant vectors associated with each of said characters, and a ninth plurality of binary values for inputting said optimized moment invariant vectors into said fuzzy logic system, a fifth plurality of binary values for evaluating said simulations with respect to a threshold parameter; and a sixth plurality of binary values for selecting one of said plurality of chromosomes resulting from said fifth plurality of binary values for evaluating said simulations with respect to said threshold parameter if said one of said plurality of chromosomes satisfies said threshold parameter.

* * * * *